United States Patent
Bhushan et al.

(10) Patent No.: US 9,706,572 B2
(45) Date of Patent: Jul. 11, 2017

(54) TECHNIQUES FOR OBTAINING AND MAINTAINING ACCESS TO A WIRELESS COMMUNICATION MEDIUM

(71) Applicant: QUALCOMM Incorporated, San Diego, CA (US)

(72) Inventors: Naga Bhushan, San Diego, CA (US); Durga Prasad Malladi, San Diego, CA (US); Ahmed Kamel Sadek, San Diego, CA (US); Kiran Kumar Somasundaram, San Diego, CA (US); Anastasios Stamoulis, San Diego, CA (US); Aleksandar Damnjanovic, Del Mar, CA (US); Yongbin Wei, La Jolla, CA (US); Dexu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/618,704

(22) Filed: Feb. 10, 2015

(65) Prior Publication Data
US 2015/0319784 A1 Nov. 5, 2015

Related U.S. Application Data

(60) Provisional application No. 61/986,729, filed on Apr. 30, 2014.

(51) Int. Cl.
*H04W 74/08* (2009.01)

(52) U.S. Cl.
CPC ....... *H04W 74/08* (2013.01); *H04W 74/0816* (2013.01)

(58) Field of Classification Search
CPC ............ H04W 84/12; H04W 74/0816; H04W 16/00; H04W 16/16; H04W 74/0808;
(Continued)

(56) References Cited

U.S. PATENT DOCUMENTS

| | | | |
|---|---|---|---|
| 2005/0041616 A1* | 2/2005 | Ginzburg | H04L 1/0021 370/328 |
| 2009/0117896 A1* | 5/2009 | Baldemair | H04J 11/0093 455/434 |

(Continued)

FOREIGN PATENT DOCUMENTS

| FI | WO 2013086659 A1 * | 6/2013 | ............ H04W 74/08 |
|---|---|---|---|
| WO | WO-2013086659 A1 | 6/2013 | |

OTHER PUBLICATIONS

IPEA/EPO, Second Written Opinion of the International Preliminary Examining Authority, Int'l App. No. PCT/US2015/026147, Apr. 8, 2016, European Patent Office, Rijswijk, NL, 6 pgs.

(Continued)

*Primary Examiner* — Jamal Javaid
(74) *Attorney, Agent, or Firm* — Holland & Hart

(57) ABSTRACT

Techniques are described for wireless communication. One method includes implementing, at a first node, a first access protocol to contend for access to a wireless communication medium shared by a plurality of nodes; determining whether a triggering event has occurred; and implementing, at the first node, a second access protocol to contend for access to the wireless communication medium based at least in part on a determination that the triggering event has occurred.

27 Claims, 22 Drawing Sheets

(58) Field of Classification Search
CPC ............. H04W 16/14; H04W 72/0446; H04W 72/0453
See application file for complete search history.

(56) References Cited

U.S. PATENT DOCUMENTS

| | | | | |
|---|---|---|---|---|
| 2010/0330992 | A1* | 12/2010 | Bhattacharjee | H04W 52/028 455/436 |
| 2011/0176435 | A1* | 7/2011 | Khandekar | H04L 5/16 370/252 |
| 2013/0086659 | A1 | 4/2013 | Tsuji et al. | |
| 2013/0203458 | A1* | 8/2013 | Charbit | H04W 52/34 455/522 |
| 2013/0322279 | A1* | 12/2013 | Chincholi | H04W 36/0088 370/252 |
| 2013/0343288 | A1* | 12/2013 | Ratasuk | H04W 72/1215 370/329 |
| 2014/0094188 | A1* | 4/2014 | Kazmi | G01S 5/0242 455/456.1 |
| 2015/0195849 | A1* | 7/2015 | Bashar | H04W 16/14 370/330 |
| 2015/0223075 | A1* | 8/2015 | Bashar | H04W 16/14 370/329 |
| 2015/0264699 | A1* | 9/2015 | Fwu | H04L 5/0001 370/329 |
| 2015/0271692 | A1* | 9/2015 | Han | H04L 5/0098 370/252 |
| 2016/0269978 | A1* | 9/2016 | Bashar | H04W 48/10 |

OTHER PUBLICATIONS

ISA/EPO, International Search Report and Written Opinion of the International Searching Authority, Int'l App. No. PCT/US2015/026147, Jul. 29, 2015, European Patent Office, Rijswijk, NL, 9 pgs.

\* cited by examiner

TECHNIQUES FOR OBTAINING AND MAINTAINING ACCESS TO A WIRELESS COMMUNICATION MEDIUM

CROSS REFERENCES

The present application for patent claims priority to U.S. Provisional Patent Application No. 61/986,729 by Bhushan et al., entitled "Techniques For Obtaining And Maintaining Access To A Wireless Communication Medium," filed Apr. 30, 2014, assigned to the assignee hereof, which is hereby incorporated by reference in its entirety.

FIELD OF THE DISCLOSURE

The present disclosure, for example, relates to wireless communication systems, and more particularly to techniques for obtaining and maintaining access to a wireless communication medium.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, implement a Listen Before Talk (LBT) protocol to gain access to the unlicensed radio frequency spectrum band. An LBT protocol may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

In some cases, transmissions by one or more nodes over an unlicensed radio frequency spectrum band may prevent a base station or UE from gaining access to the unlicensed radio frequency spectrum, resulting in the base station or UE being "starved" of accessing the unlicensed radio frequency spectrum band.

SUMMARY

The present disclosure, for example, relates to one or more techniques for obtaining and maintaining access to a wireless communication medium. The techniques enable a node of a wireless communication system to transition from implementing a first access protocol to contend for access to a wireless communication medium, to a second access protocol to contend for access to the wireless communication medium, upon determining that a triggering event has occurred. The triggering event may include, for example, a determination that the node has not received fair use of the wireless communication medium or a determination that another node is interfering with transmissions from or transmissions to the node. In some examples, the second access protocol may include the transmission of a signal that causes other nodes to discontinue transmissions over the wireless communication medium. In other examples, the second access protocol may include transmission of a signal that may maintain access to the wireless communication medium and prevent other nodes from accessing the wireless communication medium.

In an example, a method for wireless communication is described. In one example, the method may include implementing, at a first node, a first access protocol to contend for access to a wireless communication medium shared by a plurality of nodes; determining whether a first triggering event has occurred; and implementing, at the first node, a second access protocol to contend for access to the wireless communication medium based at least in part on a determination that the first triggering event occurred.

In some examples, the implementing the first access protocol may include implementing a frame-based access protocol. In some examples, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes. In some examples, the method may include determining the use of the wireless communication medium by at least the second node, where the determining the use of the wireless communication medium by at least the second node includes decoding preambles of data packets transmitted by at least the second node to determine a duration of each of the data packets transmitted by at least the second node.

In some examples, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium may be based at least in part on a discontinuous use of the wireless communication medium by at least a second node of the plurality of nodes.

In some examples, the first triggering event may include an interference with transmissions of the first node by transmissions of at least a second node of the plurality of nodes. In some examples, the implementing the first access protocol to contend for access to the wireless communication medium comprises implementing a Listen Before Talk (LBT) protocol.

In some examples, the implementing the second access protocol to contend for access to the wireless communication medium may include transmitting a signal over the wireless communication medium without contending for access to the wireless communication medium, and implementing an LBT protocol in combination with the transmitting the signal over the wireless communication medium. The transmitting the signal may include transmitting at least one Clear To Send to self (CTS-to-self) signal. In some examples, at least one Network Allocation Vector (NAV) of the at least one CTS-to-self signal specifies a reservation time period of the wireless communication medium extending until a next LBT frame. In some examples, at least one NAV of the at least one CTS-to-self signal specifies a reservation time period of the wireless communication medium extending across a plurality of LBT frames.

In some examples, the transmitting the signal may include transmitting at least one Wi-Fi beacon signal. In some examples, the signal may be transmitted over the wireless communication medium following a transmission of a Clear Channel Assessment (CCA)-Exempt Transmission (CET) over the wireless communication medium by the first node.

In some examples, the implementing the second access protocol to contend for access to the wireless communication medium may include detecting a gap between transmissions of at least a second node over the wireless communication medium, and beginning the transmitting the signal over the wireless communication medium during the gap between the transmissions. In some examples, the gap may have a duration shorter than a Distributed Coordination Function (DCF) Interframe Space (DIFS) duration. In some examples, the gap may have a duration equal to or approximately equal to a Short Interframe Space (SIFS) duration.

In some examples, the implementing the second access protocol to contend for access to the wireless communication medium may include detecting a gap between transmissions of at least a second node over the wireless communication medium; transmitting at least one Channel Usage Beacon Signal (CUBS) over the wireless communication medium, beginning during the gap and continuing to a start of a next subframe of an LBT frame; and transmitting at least one LTE/LTE-A subframe over the wireless communication medium, beginning after transmitting the at least one CUBS and continuing to a start of a next LBT frame.

In some examples, the method may include repeating the transmission of the signal with a periodicity. In some examples, the method may include selecting the periodicity based at least in part on a number of the plurality of nodes transmitting in proximity to the first node.

In some examples, the method may include adjusting a power of the signal based at least in part on a proximity of at least a second node to the first node.

In some examples, the wireless communication medium may include a radio frequency spectrum band shared by the plurality of nodes, and different nodes may implement different protocols to contend for access to the radio frequency spectrum band. In some examples, the radio frequency spectrum band may include an unlicensed radio frequency spectrum band. In some examples, the first node may include an LTE/LTE-A base station and a second node of the plurality of nodes may include a Wi-Fi access point. In some examples, the first node may include a first LTE/LTE-A base station, a second node of the plurality of nodes may include a second LTE/LTE-A base station, and the first LTE/LTE-A base station and the second LTE/LTE-A base station may operate asynchronously.

In some examples, the method may include determining whether a second triggering event has occurred. When the second triggering event has occurred, the method may include implementing, at the first node, the first access protocol to contend for access to the wireless communication medium. In some examples, the second triggering event may include an absence of the first triggering event over a predetermined time.

In an example, an apparatus for wireless communication is described. In one example, the apparatus may include means for implementing, at a first node, a first access protocol to contend for access to a wireless communication medium shared by a plurality of nodes; means for determining whether a first triggering event has occurred; and means for implementing, at the first node, a second access protocol to contend for access to the wireless communication medium based at least in part on a determination that the first triggering event has occurred. In some examples, the apparatus may further include means for implementing one or more aspects of the method for wireless communication described above with respect to the first set of illustrative examples.

In an example, another apparatus for wireless communication is described. In one example, the apparatus may include a processor, memory in electronic communication with the processor, and instructions stored in the memory. The instructions may be executable by the processor to implement, at a first node, a first access protocol to contend for access to a wireless communication medium shared by a plurality of nodes; determine whether a first triggering event has occurred; and implement, at the first node, a second access protocol to contend for access to the wireless communication medium based at least in part on a determination that the first triggering event has occurred. In some examples, the instructions may also be executable by the processor to implement one or more aspects of the method for wireless communication described above with respect to the first set of illustrative examples.

In an example, a computer program product for communication by a first node in a wireless communication system is described. In one example, the computer program product may include a non-transitory computer-readable medium storing instructions executable by a processor to cause the first node to implement a first access protocol to contend for access to a wireless communication medium shared by a plurality of nodes; determine whether a first triggering event has occurred; and implement a second access protocol to contend for access to the wireless communication medium based at least in part on a determination that the first triggering event has occurred. In some examples, the instructions may also be executable by the processor to cause the wireless communication apparatus to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
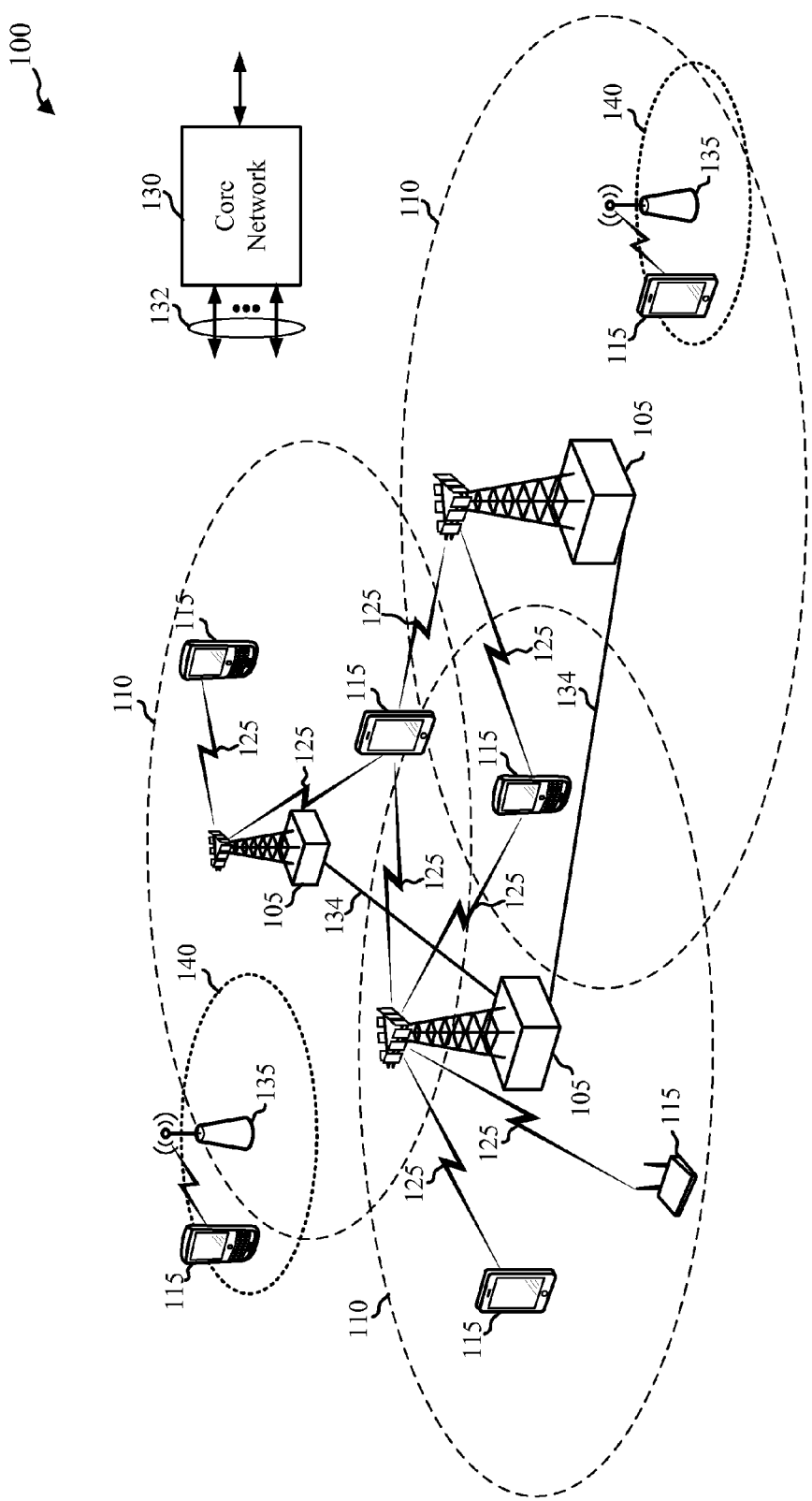
FIG. 1 shows a block diagram of a wireless communication system, in accordance with various aspects of the present disclosure.

Techniques are described in which a node may obtain and maintain access to a wireless communication medium. For example, techniques are described in which access to a wireless communication medium may be obtained or maintained by a node that is being prevented from accessing the wireless communication medium. Techniques are also described in which access to a wireless communication medium may be obtained or maintained by a node that detects interference of transmissions from or transmissions to the node over the wireless communication medium. In some examples, the wireless communication medium may include a radio frequency spectrum band (e.g., an authorized shared access radio frequency spectrum band) that is shared by a plurality of nodes. In some examples, the radio frequency spectrum band may be an unlicensed radio frequency spectrum band (e.g., a radio frequency spectrum band for which apparatuses may need to contend for access, at least in part, for unlicensed use such as Wi-Fi use or unlicensed LTE/LTE-A use). In some examples, the unlicensed radio frequency spectrum band may be used for cellular communications (e.g., Long Term Evolution (LTE) communications or LTE-Advanced (LTE-A) communications).

Consider a wireless communication system in which an LTE/LTE-A transmitting apparatus (e.g., an eNB, a base station, or a UE) communicates over a channel of a wireless communication medium (e.g., an unlicensed radio frequency spectrum band), but only communicates during a frame of the wireless communication medium after successfully contending for access to the frame using a frame-based LBT protocol. Also consider that the LTE/LTE-A transmitting apparatus is in the vicinity of one or more Wi-Fi nodes, all of which are in energy detection/carrier sense multiple access (CSMA) range of one another. In such an example, the Wi-Fi nodes may occupy the channel of the wireless communication medium (e.g., the unlicensed radio frequency spectrum band) as long as any one of the Wi-Fi nodes has a non-empty transmission queue. If the traffic density is high enough that the transmission queues of the Wi-Fi nodes are not empty, the LTE/LTE-A transmitting apparatus may rarely, if ever, be able to access the wireless communication medium (e.g., the unlicensed radio frequency spectrum band). On the other hand, fair sharing of the wireless communication medium suggests that all nodes desiring to transmit over the channel of the unlicensed radio frequency spectrum band should be able to use the channel of the wireless communication medium (e.g., the unlicensed radio frequency spectrum band) for roughly the same duration of time.

One reason for the unfair medium sharing described above is that the Wi-Fi nodes may implement a CSMA protocol to contend for access to the wireless communication medium, while the LTE/LTE-A transmitting apparatus may implement a frame-based LBT protocol that is incompatible with the CSMA protocol when it comes to fair sharing of the wireless communication medium. For example, the CSMA protocol implemented by the Wi-Fi nodes may be based on a contention mechanism with memory, wherein a Wi-Fi node that is waiting to use the wireless communication medium may count the total number of its (possibly discontinuous) idle periods, and start accessing the wireless communication medium once the accumulated idle period count exceeds a randomly generated backoff value. In contrast, the frame-based LBT protocol implemented by the LTE/LTE-A transmitting apparatus may be based on a memory-less backoff mechanism, wherein the LTE/LTE-A transmitting apparatus waits an integer number of frame periods whenever it fails to successfully contend for access to the wireless communication medium, irrespective of the number of times the LTE/LTE-A transmitting apparatus has failed contention for accessing the wireless communication medium. The lack of a contention mechanism with memory of the LTE/LTE-A transmitting apparatus, for the number of times it has failed contention for accessing the wireless communication medium, puts the LTE/LTE-A transmitting apparatus at a disadvantage with respect to fair sharing of the wireless communication medium with the Wi-Fi nodes.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a plurality of Wi-Fi access points 135, a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. The Wi-Fi access points 135 may communicate with the UEs 115 via one or more Wi-Fi antennas. Each of the base stations 105 and Wi-Fi access points 135 may provide communication coverage for a respective coverage area 110 or 140. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as wireless wide area network (WWAN) or wireless local area network (WLAN) radio access technologies (e.g., cellular or Wi-Fi radio access technologies). The base stations 105 may be associated with the same or different access networks or operator deployments. The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to certain users for certain uses) or an unlicensed radio frequency spectrum band (e.g., a radio frequency spectrum band for which apparatuses may need to contend for access, at least in part, for unlicensed use (e.g., Wi-Fi use) or LTE/LTE-A use in an unlicensed radio frequency spectrum band. In other examples, the wireless communication system 100 may support wireless communication using one or more access technologies different from LTE/LTE-A. In LTE/LTE-A communication systems, the term evolved NodeB or eNB may be used, for example, to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN (e.g., Wi-Fi) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in one mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band or an unlicensed radio frequency spectrum band, while OFDMA, SC-FDMA or resource block interleaved FDMA waveforms may be used in the communication links 125 for LTE/LTE-A uplink communications in a licensed radio frequency spectrum band or an unlicensed radio frequency spectrum band.

At times, one or more of the base stations 105 or UEs 115 may be prevented from accessing the unlicensed radio frequency spectrum band as a result of transmissions being made by other nodes (e.g., the Wi-Fi access points 135).

Figure 2:
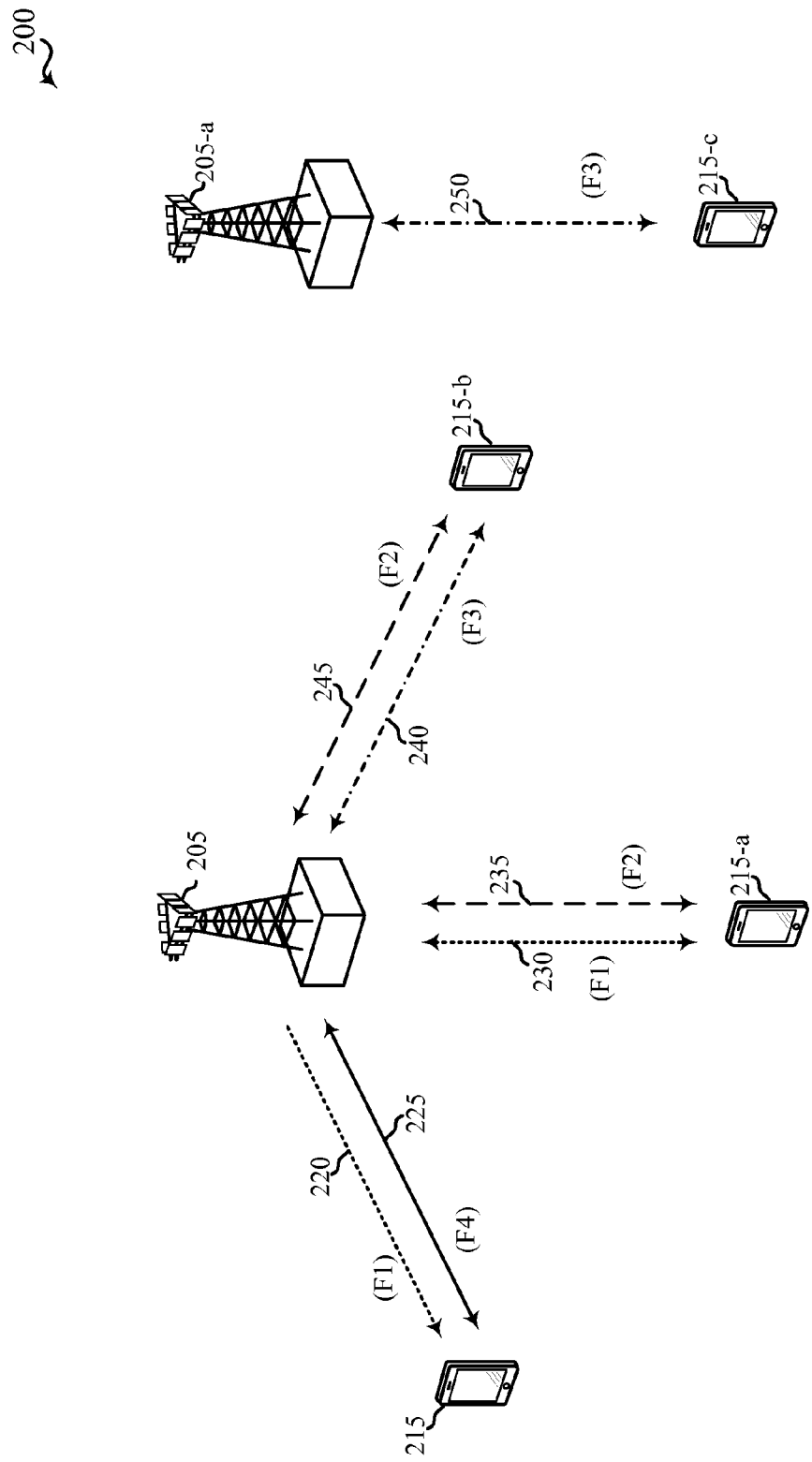
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). A supplemental downlink scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting apparatus whether a channel of an unlicensed radio frequency spectrum band is available or in use during the gating interval (also referred to as an LBT frame or a CCA frame). When a CCA indicates that the channel is available (e.g., "clear" for use) during a corresponding LBT frame, the transmitting apparatus may reserve or use the channel of the unlicensed radio frequency spectrum band during part or all of the LBT frame. When the CCA procedure indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure (e.g., a periodic LTE/LTE-A radio frame structure). Examples of such synchronization are shown in FIG. 3.

Figure 3:
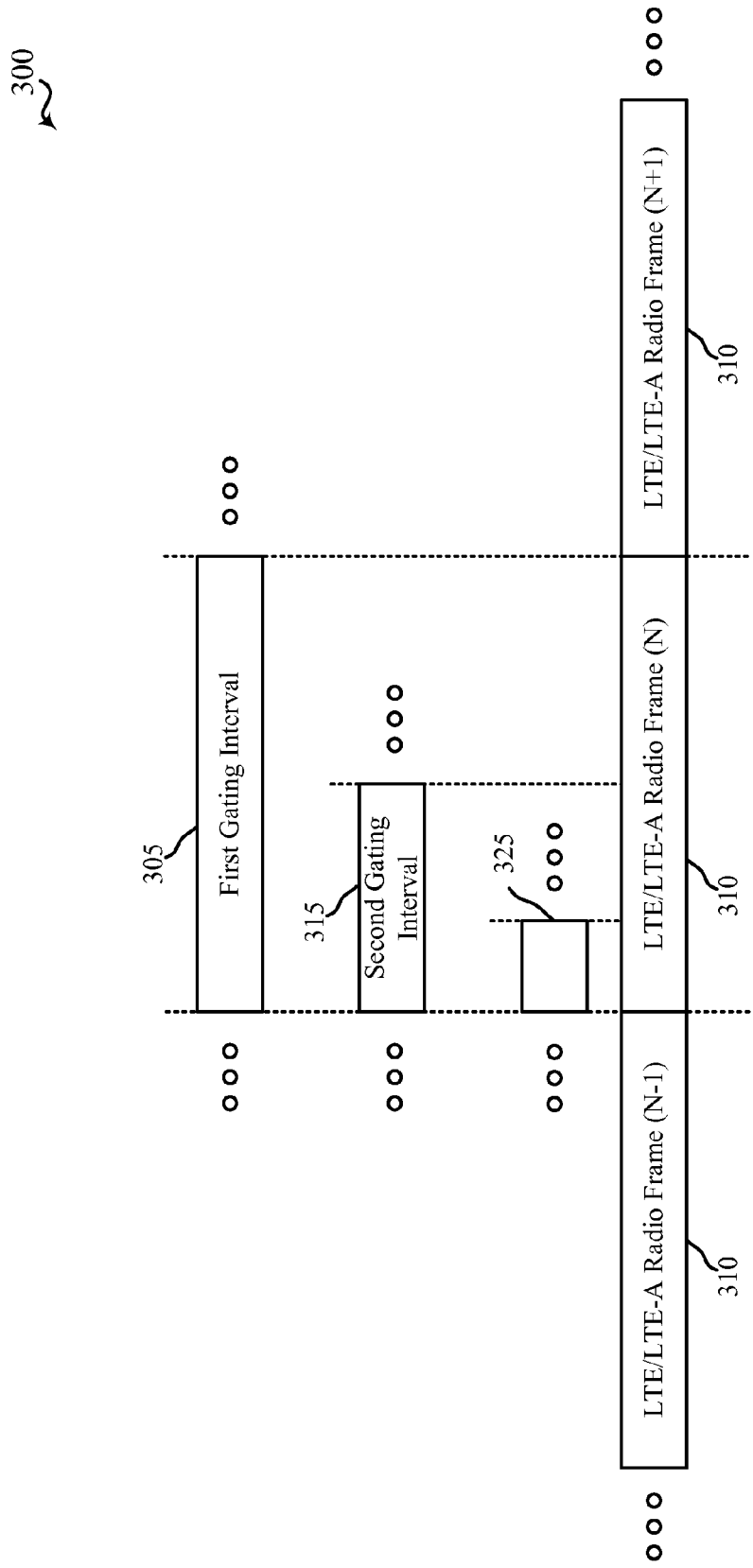
FIG. 3 shows examples of a gating interval (or LBT frame) in an unlicensed radio frequency spectrum band, in accordance with various aspects of the present disclosure.

FIG. 3 shows examples 300 of a gating interval (or LBT frame) in an unlicensed radio frequency spectrum band, in accordance with various aspects of the present disclosure. A first gating interval 305, a second gating interval 315, or a third gating interval 325 may be used as a periodic gating interval by an eNB or UE that supports transmissions over the unlicensed radio frequency spectrum band. Examples of such an eNB may include the base station 105, 205, or 205-$a$ described with reference to FIG. 1 or 2, and examples of such a UE may include the UE 115, 215, 215-$a$, 215-$b$, or 215-$c$ described with reference to FIG. 1 or 2. The first gating interval 305, the second gating interval 315, or the third gating interval 325 may in some examples be used with the wireless communication system 100 or 200 described with reference to FIG. 1 or 2.

By way of example, the duration of the first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of certain subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic frame structure associated with the cellular downlink. In some examples, an "approximate sub-multiple of" means the duration of the second gating interval 315 or the third gating interval 325 is within a cyclic prefix (CP) duration of the duration of a sub-multiple of (e.g., half or one-fifth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of the unlicensed radio frequency spectrum band.

Figure 4A:
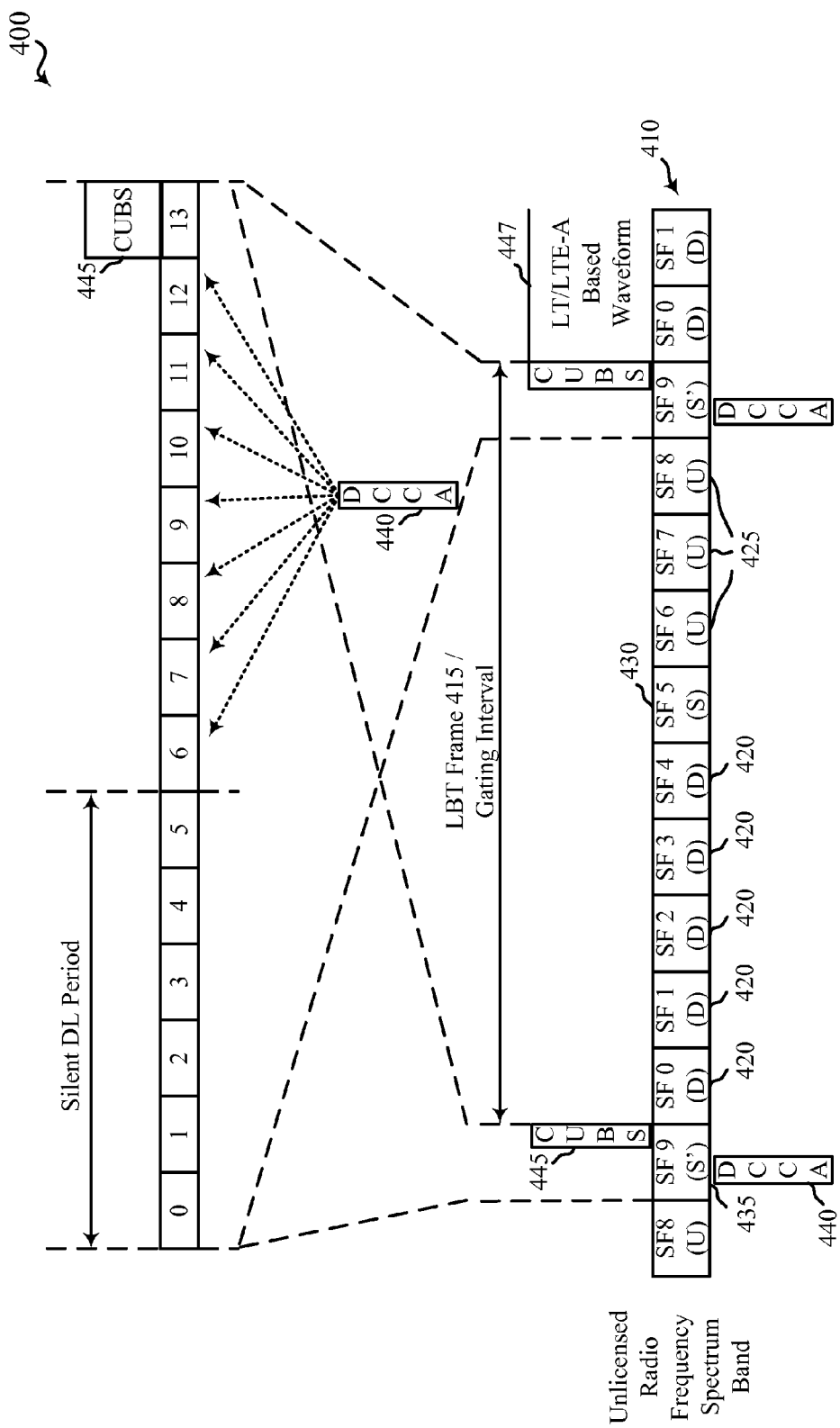
FIG. 4A shows an example of wireless communication over an unlicensed radio frequency spectrum band, in accordance with various aspects of the present disclosure.

FIG. 4A shows an example 400 of wireless communication 410 over an unlicensed radio frequency spectrum band, in accordance with various aspects of the present disclosure. An LBT frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420.

During the S' subframe 435, a downlink clear channel assessment (DCCA) 440 may be performed by one or more base stations, such as one or more of the base stations 105, 205, or 205-$a$ described with reference to FIG. 1 or 2, to reserve, for a period of time, the channel over which the wireless communication 410 occurs. Following a successful DCCA 440 by a base station, the base station may transmit a channel usage beacon signal (CUBS) 445 to provide an indication to other base stations or apparatuses (e.g., UEs, Wi-Fi access points, etc.) that the base station has reserved the channel. In some examples, a CUBS 445 may be transmitted using a plurality of interleaved resource blocks. Transmitting a CUBS 445 in this manner may enable the CUBS 445 to occupy at least a certain percentage of the available frequency bandwidth in the unlicensed radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS) or channel state information reference signal (CSI-RS). Following the transmission of the CUBS 445, an LTE/LTE-A based waveform 447 may be transmitted, from a base station to a UE, over the unlicensed radio frequency spectrum band.

The S' subframe 435 may include 14 OFDM symbols, numbered 0 through 13 in FIG. 4A. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for the DCCA 440. In the example 400, the S' subframe 435 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 440, a base station 105 may evaluate a mapping-function of the form:

$$F_D(\text{GroupID},t) \in \{1,2,3,4,5,6,7\}$$

where GroupID is a "deployment group-id" assigned to the base station 105, and t is the LBT frame number corresponding to a gating interval or frame for which the DCCA 440 is performed.

Figure 4B:
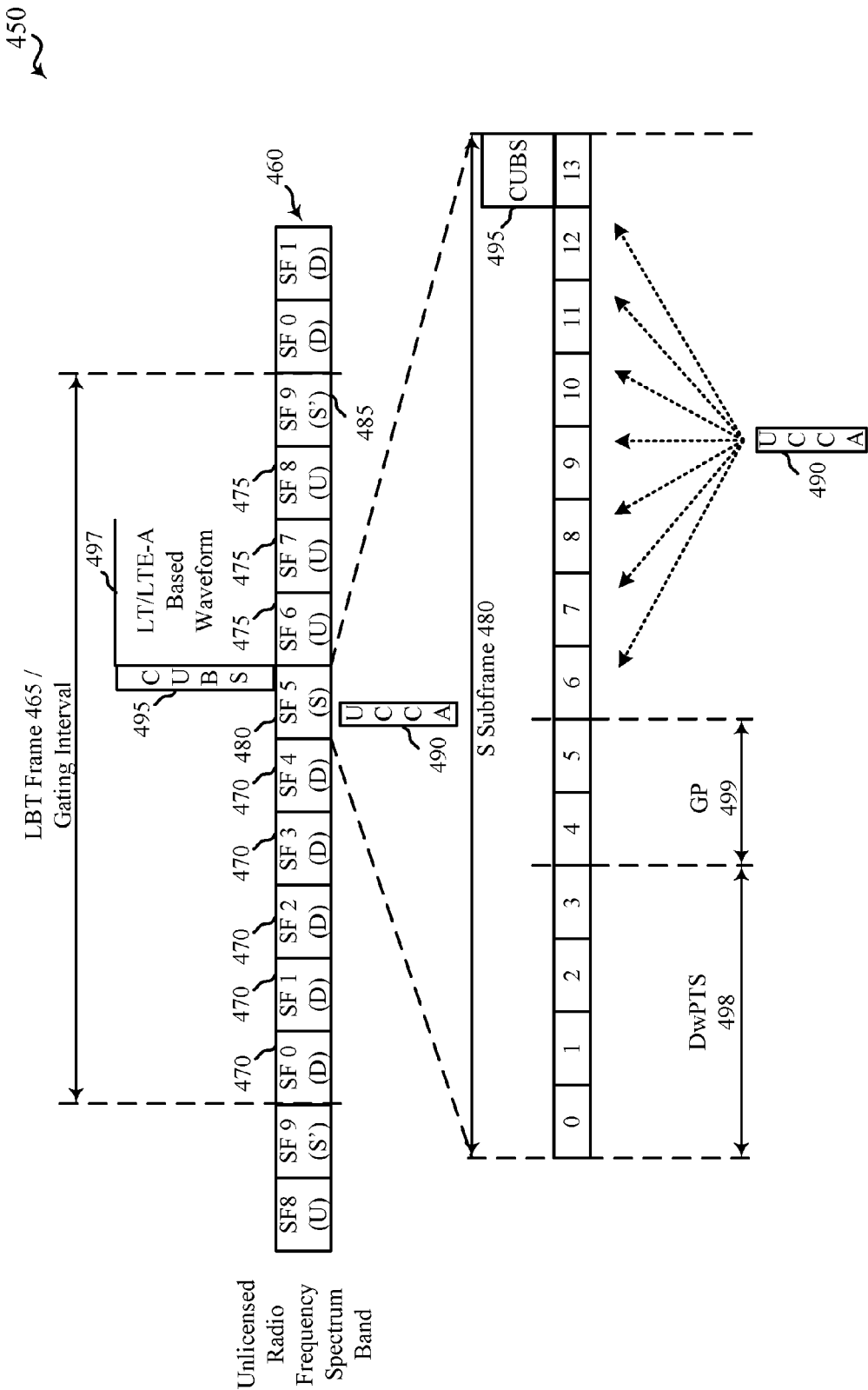
FIG. 4B shows an example of a wireless communication over an unlicensed radio frequency spectrum band, in accordance with various aspects of the present disclosure.

FIG. 4B shows an example 400 of a wireless communication 460 over an unlicensed radio frequency spectrum band, in accordance with various aspects of the present disclosure. An LBT frame 465, which may correspond to a gating interval such as the first gating interval 305 described with reference to FIG. 3 or the LBT frame 415 described with reference to FIG. 4A, may have a duration of ten milliseconds and include a number of downlink subframes 470, a number of uplink subframes 475, and two types of special subframes (e.g., an S subframe 480 and an S' subframe 485. The S subframe 480 may provide a transition between downlink subframes 470 and uplink subframes 475, while the S' subframe 485 may provide a transition between uplink subframes 475 and downlink subframes 470. During the S subframe 480, an uplink CCA (UCCA) 490 may be performed by one or more UEs, such as one or more of the UEs 115, 215, 215-a, 215-b, or 215-c described above with reference to FIG. 1 or 2, to reserve, for a period of time, the channel over which the wireless communication 460 occurs. Following a successful UCCA 490 by a UE, the UE may transmit a CUBS 495 to provide an indication to other UEs or apparatuses (e.g., base stations, Wi-Fi access points, etc.) that the UE has reserved the channel. In some examples, a CUBS 495 may be transmitted using a plurality of interleaved resource blocks. Transmitting a CUBS 495 in this manner may enable the CUBS 495 to occupy at least a certain percentage of the available frequency bandwidth in the unlicensed radio frequency spectrum band and satisfy one or more regulatory requirements (e.g., a requirement that the CUBS 495 occupy at least 80% of the available frequency bandwidth). The CUBS 495 may in some examples take a form similar to that of an LTE/LTE-A cell-specific reference signal (CRS) or channel state information reference signal (CSI-RS). Following the transmission of the CUBS 495, an LTE/LTE-A based waveform 497 may be transmitted, from a UE to a base station, over the unlicensed radio frequency spectrum band.

The S subframe 480 may include 14 OFDM symbols, numbered 0 through 13 in FIG. 4B. A first portion of the S subframe 480, symbols 0 through 3 in this example, may be used as a downlink pilot time opportunity (DwPTS) 498, and a second portion of the S subframe 480 may be used as a guard period (GP) 499. A third portion of the S subframe 480 may be used for UCCA 490. In the example 400, the S subframe 480 includes seven UCCA opportunities, included in symbols 6 through 12. Use of the UCCA opportunities by different UEs may be coordinated to provide more efficient system operation (e.g., synchronous system operation). In some examples, in order to determine which of the seven possible UCCA opportunities to use to perform a UCCA 490, a UE may evaluate a mapping-function of the form:

$$F_U(\text{GroupID}, t) \in \{1,2,3,4,5,6,7\}$$

where GroupID is a "deployment group-id" assigned to the UE, and t is the LBT frame number corresponding to a frame for which a UCCA 490 is performed.

The mapping function for a DCCA 440 or a UCCA 490 may be constructed based on different criteria, depending on whether the mapping function will have an orthogonalization or a non-orthogonalization property. In examples with orthogonal LBT access, the mapping function may have an orthogonalization property according to:

$$F_{D/U}(x,t) \neq F_{D/U}(y,t)$$

$$\text{GroupID } x,y \in \{1,2,3,4,5,6,7\}$$

for all time t, whenever x≠y represent different group-ids. In this case, base stations or UEs with different group-ids may perform CCAs (e.g., DCCAs 440 or UCCAs 490) during non-overlapping CCA opportunities. In the absence of interference, the base station or UE with the group-id which maps to an earlier CCA opportunity may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier CCA opportunity (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations or UEs of different deployments may be assigned different group-ids, so that with orthogonal CCA opportunity mapping, access to the channel is mutually exclusive.

In examples with non-orthogonal, or overlapping, CCA opportunity access, the mapping function may allow more than seven group ids. In some situations, for example, it may be useful to support more than seven deployment group-ids, in which case it is not possible to maintain the orthogonality property of CCA opportunity mapping functions. In such cases, it may be desirable to reduce the frequency of collision between any two group-ids. In some examples, non-orthogonal CCA opportunity mapping sequences may also be used to provide fair channel access among deployments without tight coordination on LBT opportunities. One example of a non-orthogonal CCA opportunity mapping sequence is given by:

$$F_{D/U}(x,t) = R_{1,7}(x,t)$$

$$\text{GroupID } x = \epsilon\{1,2, \ldots 2^{16}\}$$

where $R_{1,7}(x,t)$ is a pseudo-random number generator between 1 and 7 chosen independently for GroupID x. In this case, there could be potential collisions between base stations or UEs of different GroupIDs in the same LBT frame t.

Thus, CCA opportunities may be selected according to the noted mapping functions and used for a DCCA 440 or a UCCA 490. Upon successfully contending for access to an unlicensed radio frequency spectrum band by performing a successful DCCA 440 or UCCA 490, a transmitting apparatus (e.g., a base station such as the base station 105, 205, or 205-a described with reference to FIG. 1 or 2, or a UE such as the UE 115, 215, 215-a, 215-b, or 215-c described with reference to FIG. 1 or 2) may use the unlicensed radio frequency spectrum band to transmit data or control signals.

Figure 4C:
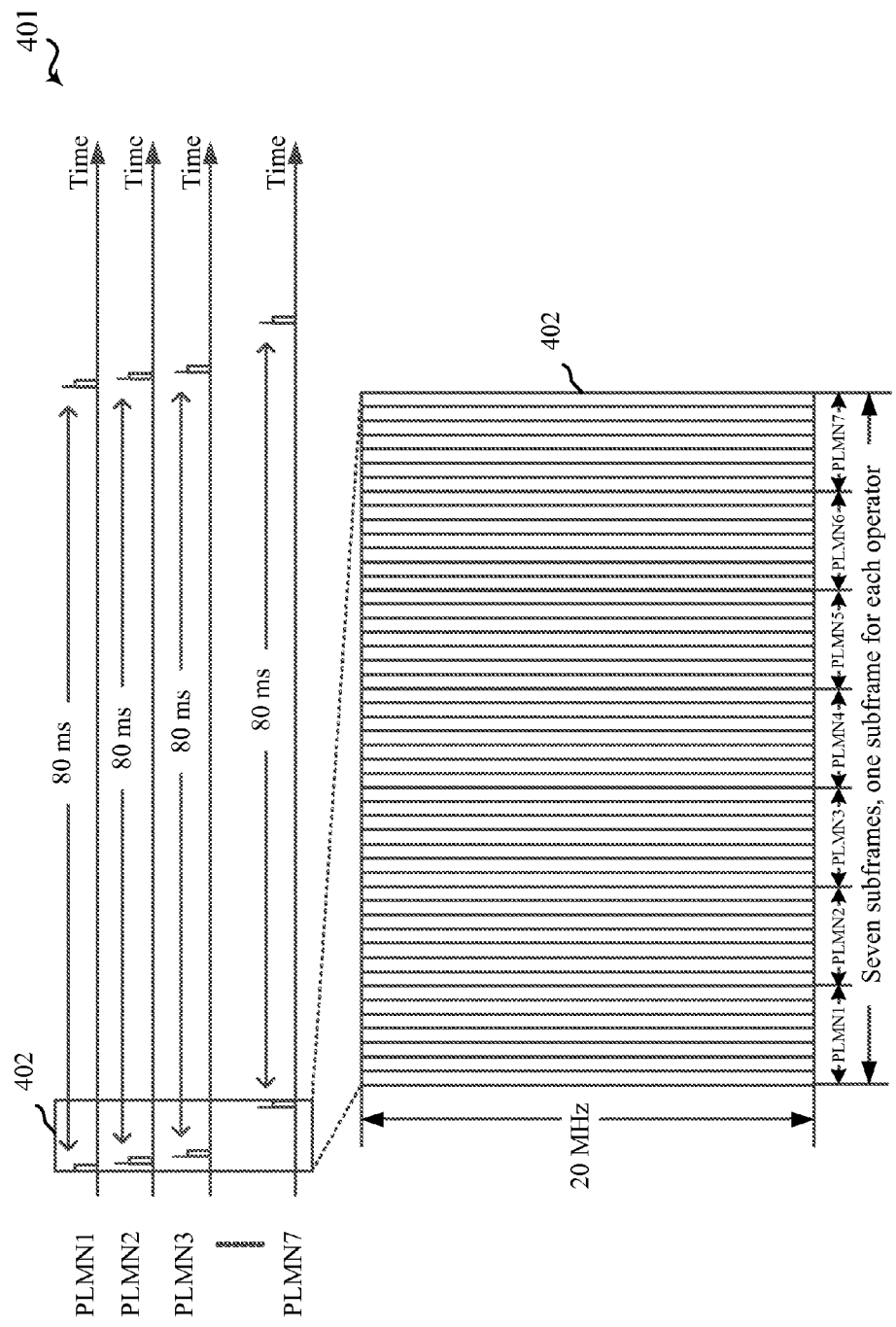
FIG. 4C shows an example of resource allocations for CCA-Exempt Transmissions (CETs) of synchronous operators in an unlicensed radio frequency spectrum band, in accordance with various aspects of the present disclosure.

FIG. 4C shows an example 401 of resource allocations for CCA-Exempt Transmissions (CETs) of synchronous operators in an unlicensed radio frequency spectrum band, in accordance with various aspects of the present disclosure. A CET may be made without a need to perform a CCA (e.g., a DCCA or an uplink CCA (UCCA)) to first gain access to the unlicensed radio frequency spectrum band. Instead, an operator is exempted from performing a CCA for the purpose of transmitting a CET.

As shown, an allocation of resources 402 for CETs may be made, for example, once every eighty milliseconds (80 ms) or once every CET period, where the CET period may have a configurable periodicity. Each of a number of operators in the unlicensed spectrum (e.g., different PLMNs) may be provided a separate subframe (shown) or subframes (not shown) for transmitting CETs. By way of example, FIG. 4C shows adjacent CET subframes for seven different operators (e.g., operators PLMN1, PLMN2, . . . , PLMN7). Such a CET transmission framework may be applicable to a downlink or uplink between a base station and a UE.

Figure 5:
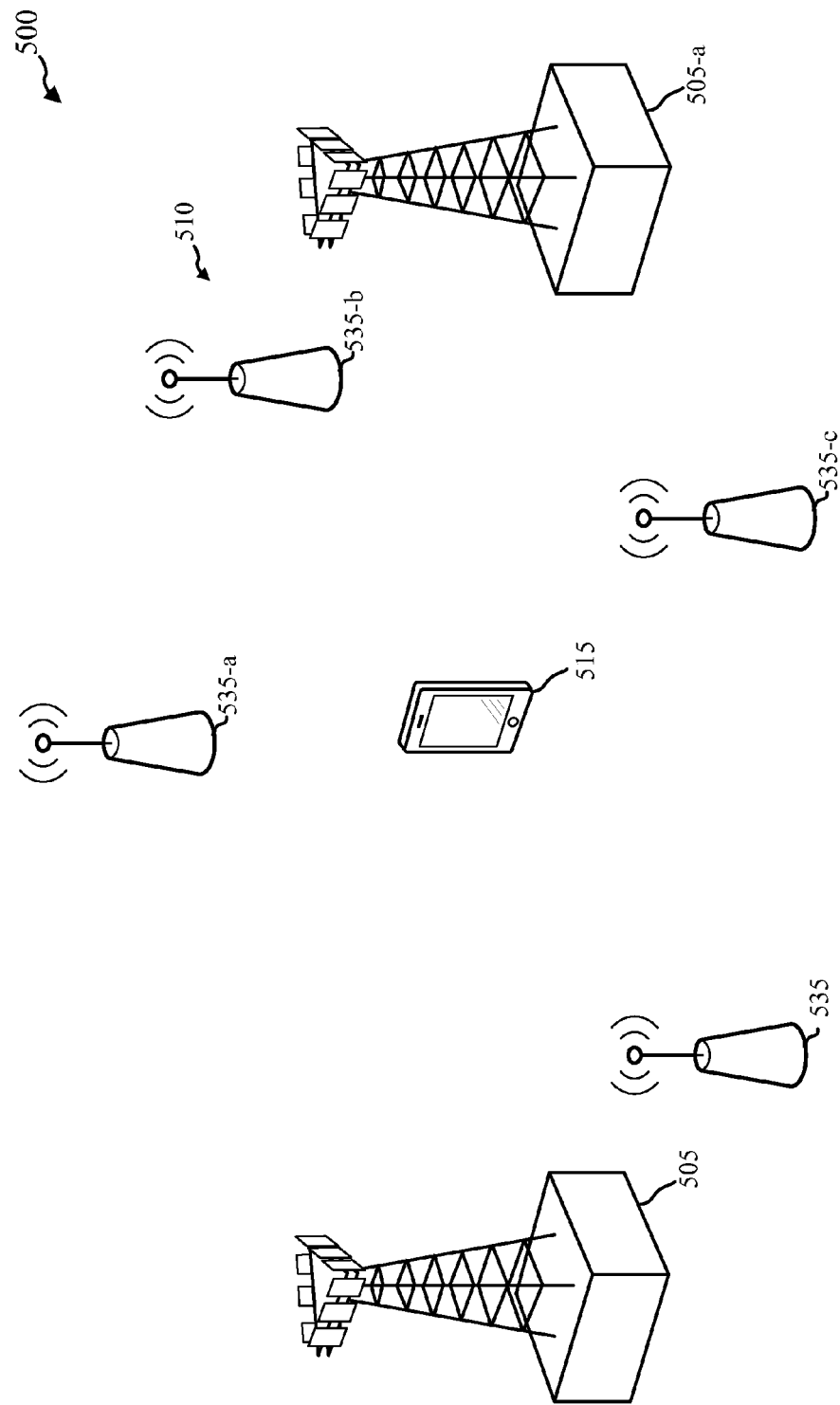
FIG. 5 shows a wireless communication system, in accordance with various aspects of the present disclosure.

FIG. 5 shows a wireless communication system 500, in accordance with various aspects of the present disclosure. The wireless communication system 500 may be an example of portions of the wireless communication system 100 or 200 described with reference to FIG. 1 or 2 and include a plurality of nodes 510. In some examples, the plurality of nodes 510 may include one or more base stations 505 (or eNBs including base stations), Wi-Fi access points 535, or UEs 515. In some examples, the plurality of nodes may include a first base station 505 and a second base station 505-a; a first Wi-Fi access point 535, a second Wi-Fi access point 535-a, a third Wi-Fi access point 535-b, and a fourth Wi-Fi access point 535-c; and a UE 515. The first base station 505 and the second base station 505-a may be examples of aspects of one or more of the base stations 105, 205, or 205-a described with reference to FIG. 1 or 2; the first Wi-Fi access point 535, the second Wi-Fi access point 535-a, the third Wi-Fi access point 535-b, and the fourth Wi-Fi access point 535-c may be examples of aspects of one or more of the Wi-Fi access points 135 described with reference to FIG. 1; and the UE 515 may be an example of aspects of one or more of the UEs 115, 215, 215-a, 215-b, or 215-c described with reference to FIG. 1 or 2.

In some examples, the plurality of nodes 510 may communicate over a wireless communication medium shared by the plurality of nodes 510. In some examples, some or all of the plurality of nodes 510 may need to contend for access to the wireless communication medium. In some examples, the wireless communication medium may be shared by the plurality of nodes 510, and different nodes within the plurality of nodes 510 may implement different protocols to contend for access to the wireless communication medium. In some examples, the wireless communication medium may include an unlicensed radio frequency spectrum band. The unlicensed radio frequency spectrum band may be a radio frequency spectrum band for which some or all of the nodes may need to contend for access, at least in part, for unlicensed use (e.g., Wi-Fi use) or LTE/LTE-A use in an unlicensed radio frequency spectrum band. In other examples, the wireless communication medium may include a shared radio frequency spectrum band for which some or all of the nodes are authorized to share access.

Under some scenarios, one or more of the plurality of nodes 510 in the wireless communication system 500 may be prevented from using the wireless communication medium for an unfair amount of time as a result of transmissions being made by one or more other of the plurality of nodes 510 in the wireless communication system 500. For example, a node may repeatedly contend for access to the wireless communication medium, but each time fail contention for access to the wireless communication medium because the wireless communication medium is being used by one or more other nodes. A node that has failed to win contention for accessing the wireless communication for an unfair amount of time may be considered starved of accessing the wireless communication medium. In examples in which the first base station 505 implements a frame-based LBT protocol to contend for access to the wireless communication medium, there may be scenarios in which one or more of the first Wi-Fi access point 535, the second Wi-Fi access point 535-a, the third Wi-Fi access point 535-b, or the fourth Wi-Fi access point 535-c are using the wireless communication medium when the first base station 505 performs a CCA for each of a number of LBT frames. When the number of LBT frames or the time for which the first base station 505 fails to successfully contend for access to the wireless communication medium exceeds a threshold (e.g., because of access of the wireless communication medium by the first Wi-Fi access point 535, the second Wi-Fi access point 535-a, the third Wi-Fi access point 535-b, or the fourth Wi-Fi access point 535-c), the first base station 505 may be considered starved of accessing the wireless communication medium by the first Wi-Fi access point 535, the second Wi-Fi access point 535-a, the third Wi-Fi access point 535-b, or the fourth Wi-Fi access point 535-c.

In other examples in which the first base station 505 implements a frame-based LBT protocol to contend for access to the wireless communication medium, there may be scenarios in which the second base station 505-a operates asynchronously to the first base station 505. Such asynchronous operation may occur, for example, when the first base station 505 and the second base station 505-a are operated by different operators (e.g., different MNOs). When the number of LBT frames or the time for which the first base station 505 fails to successfully contend for access to the wireless communication medium exceeds a threshold (e.g., because of access of the wireless communication medium by the second base station 505-a), the first base station 505 may be considered starved of accessing the wireless communication medium by the second base station 505-a.

To mitigate the afore-mentioned unfair wireless communication medium access problems, a node of the wireless communication system 500 (e.g., the first base station 505) may, upon determining that a triggering event has occurred, transition from implementing a first access protocol (e.g., an LBT protocol) to implementing a second access protocol to contend for access to the wireless communication medium. In some examples, the second access protocol may include transmitting a signal over the wireless communication medium without contending for access to the wireless communication medium, and implementing an LBT protocol in combination with transmitting the signal over the wireless communication medium. The signal transmitted by the first node may be a signal that, when detected by at least a second node of the plurality of nodes 510, causes at least the second node to discontinue transmissions over, refrain from transmitting over, or fail contention for access to, the wireless communication medium. In some examples, the node of the wireless communication system 500 may continue to implement the second access protocol, or implement the second access protocol with a periodicity, until a fair use of the wireless communication medium by the node has been attained. Fair use may be variously interpreted as, for example, fair use or use above a threshold percentage given use of the wireless communication medium by other nodes.

In some examples, the triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes 510 (e.g., a ratio of the use of the wireless communication medium by the first node and the use of the wireless communication medium by at least a second node of the plurality of nodes 510). In some examples, a node (e.g., the first base station 505) may determine the use of the wireless communication medium by at least the second node by, for example, decoding preambles (e.g., Wi-Fi preambles) of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes 510.

In some examples, and conditioned on its transmission queue being non-empty, a first node of the wireless communication system 500 may determine a time-fraction that the first node and each other node in proximity to the first node has used the wireless communication medium during a certain time period, and determine that a triggering event has occurred when the time-fraction of any other node in proximity to the first node exceeds the time-fraction of the first node by more than a threshold. In some examples, each of the base stations 505 may determine time-fractions for each of the Wi-Fi access points 535 in proximity to the respective base station 505.

In some examples, the triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples, the triggering event may include an interference of transmissions of a first node. The interference may be caused by transmissions of at least a second node of the plurality of nodes 510. The transmissions (of the first node) affected by the interference may include downlink transmissions of the first node or uplink transmissions of the first node. In some examples, the interference may be determined based at least in part on a packet error ratio (PER), channel quality indicator (CQI), or other metric satisfying a threshold. In some examples, the first node may be the first base station 505 and the second node may be a Wi-Fi access point transmitting 1) at a power level below a first threshold power level affecting an ability of the first node to successfully contend for access to the wireless communication medium (e.g., the first node may successfully contend for access to the wireless communication medium), but 2) at a power level above a second threshold power level used by a carrier sense multiple access (CSMA) protocol.

In some examples, the triggering event for a first node may be based on the activity of at least a second node transmitting proximate to the first node. A node may be considered proximate to the first node when the detected energy transmitted by the node is above an energy detection (ED) threshold used by the first node (e.g., above approximately 62 dBm). This may provide better protection to Wi-Fi devices transmitting near the first node.

The manner in which a node may transition from implementing a first access protocol to implementing a second access protocol to contend for access to a wireless communication medium may vary. Various examples of such a transition are shown in FIGS. 6-9.

Figure 6:
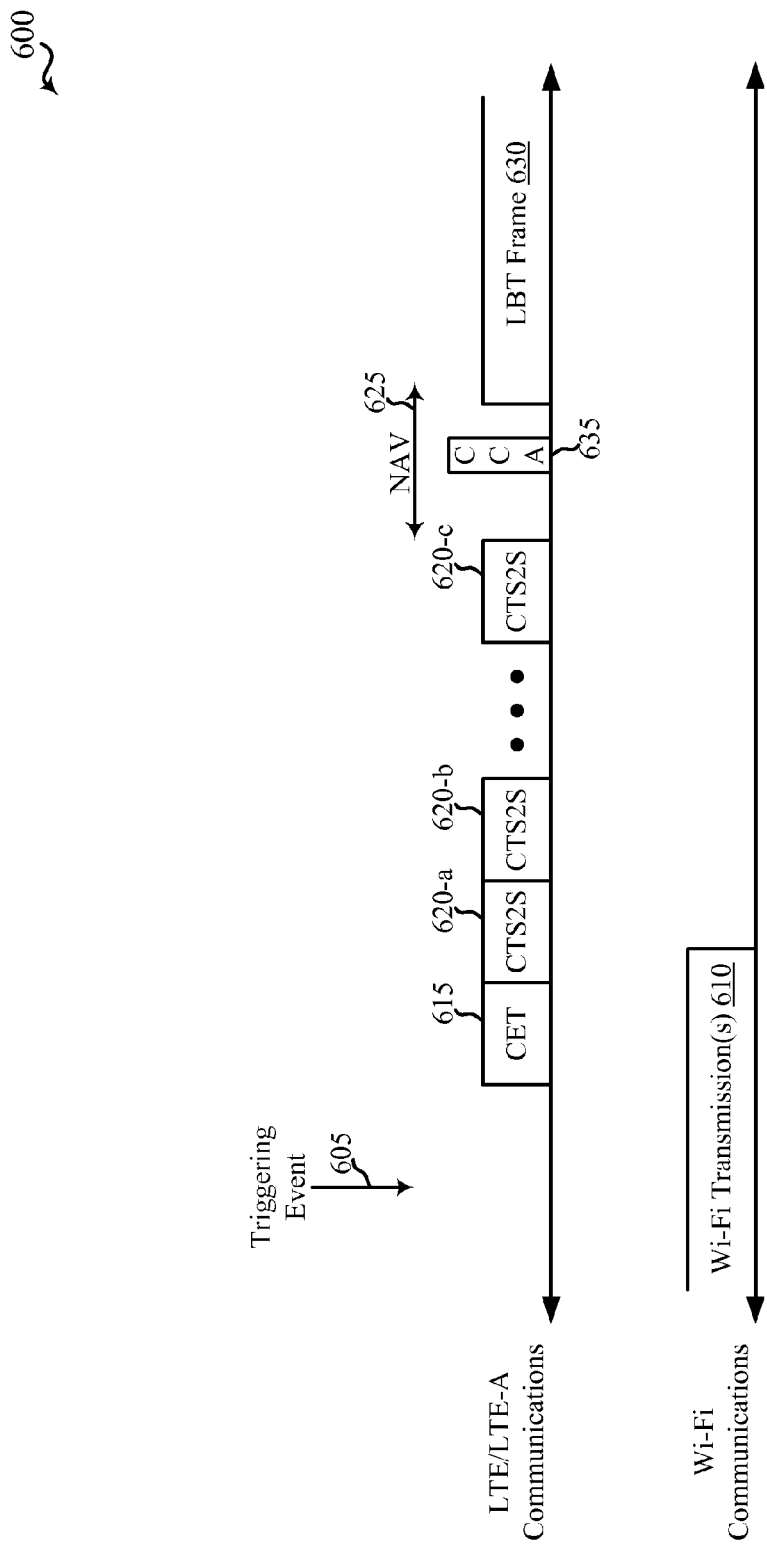
FIG. 6 shows a timeline of parallel LTE/LTE-A communications and Wi-Fi communications over a wireless communication medium (e.g., an unlicensed radio frequency spectrum band) shared by a plurality of nodes, in accordance with various aspects of the present disclosure.

FIG. 6 shows a timeline 600 of parallel LTE/LTE-A communications and Wi-Fi communications over a wireless communication medium (e.g., an unlicensed radio frequency spectrum band) shared by a plurality of nodes, in accordance with various aspects of the present disclosure. The wireless communication medium (e.g., the unlicensed radio frequency spectrum band) may be a radio frequency spectrum band for which apparatuses may need to contend for access, at least in part, for unlicensed use (e.g., Wi-Fi use) or LTE/LTE-A use in an unlicensed radio frequency spectrum band. By way of example, the LTE/LTE-A communications over the wireless communication medium (e.g., the unlicensed radio frequency spectrum band) may include transmissions by a first node (e.g., an LTE/LTE-A eNB or LTE/LTE-A base station), and the Wi-Fi communications over the wireless communication medium (e.g., the unlicensed radio frequency spectrum band) may include transmissions by at least a second node (e.g., one or more Wi-Fi access points).

Prior to the triggering event 605, the first node may implement a first access protocol to contend for access to the wireless communication medium (e.g., the unlicensed radio frequency spectrum band). However, differences in the protocols implemented by the first node and at least the second node or asynchronous operation of the first node and at least the second node, for example, may prevent the first node from accessing the wireless communication medium (e.g., the unlicensed radio frequency spectrum band). The first node may therefore determine whether a triggering event has occurred, as described, for example, with reference to FIG. 5. The triggering event may occur at a time when Wi-Fi transmissions 610 are being made over the wireless communication medium (e.g., the unlicensed radio frequency spectrum band). The triggering event may also occur at a time when other transmissions or no transmissions are being made over the wireless communication medium (e.g., the unlicensed radio frequency spectrum band).

Upon determining that the triggering event 605 has occurred, the first node may implement a second access protocol. In some examples, the second access protocol may include the first node waiting for the transmission of a CET 615 by the first node. The CET 615 may be transmitted by the first node without contending for access to the wireless communication medium (e.g., the unlicensed radio frequency spectrum band). In some examples, the CET 615 may be transmitted to facilitate node discovery, to transmit control or management signals, or for other purposes.

In some examples, a maximum duration or duty cycle of the CET 615 may exceed an actual duration or duty cycle of the CET 615. For example, a maximum duty cycle of the CET 615 may be five percent (5%) of any 50 millisecond window (providing a maximum duration of 2.5 milliseconds every 50 milliseconds), but an actual duration of the CET 615 may be four OFDM symbols (e.g., approximately 290 microseconds) every 80 milliseconds. In some examples, the unused portion of the maximum duration or duty cycle of the CET 615 may be used to transmit one or more Clear-to-Send (CTS)-to-self (CTS-to-self or CTS2S) signals, such as a first CTS2S signal 620-a, a second CTS2S signal 620-b, or a third CTS2S signal 620-c. Detection of the CTS2S signal(s) by at least the second node may cause at least the second node to discontinue transmissions over, refrain from transmitting over, or fail contention for access to, the wireless communication medium (e.g., the unlicensed radio frequency spectrum band).

Moreover, the decision to send one or more CTS2S signals may be based on how much of the duty cycle the first node (or other nodes that include LTE/LTE-A devices) wants to share with nearby Wi-Fi nodes. In one example, if the first node detects only one nearby Wi-Fi transmitter, with wireless communication medium utilization above a threshold, the first node may decide to transmit CTS2S signals with a probability that guarantees 50% wireless communication medium utilization. In addition to (or instead of) wireless communication medium utilization, the first node may employ a metric that takes into account the duty cycle or maximum allowable time in which the first node is blocked from accessing the wireless communication medium by one or more Wi-Fi devices, and adjust the frequency/pattern of CTS2S signal transmissions based at least in part on this metric. In some examples, and when the first node discovers N Wi-Fi nodes in its vicinity, the first node may select the CTS2S signal frequency/pattern to guarantee fair sharing of the wireless communication medium with the N Wi-Fi nodes, based at least in part on their traffic pattern(s) and proximity to the first node.

When CTS2S signals are transmitted in a deterministic manner (e.g., one after another), a number of randomization techniques may be employed to ensure that CTS2S signals transmitted by more than one first node may be received and properly decoded by one or more second nodes.

In some examples, each CTS2S signal may include a Network Allocation Vector (NAV) specifying a reservation time period of the wireless communication medium (e.g., the unlicensed radio frequency spectrum band). As shown in FIG. 6, a last CTS2S signal 620-c to be transmitted following the CET 615 may include an NAV 625 specifying a reservation time period of the wireless communication medium (e.g., the unlicensed radio frequency spectrum band) extending until a next LBT frame 630. Wi-Fi access points may read the NAV 625 and refrain from transmitting over the wireless communication medium (e.g., the unlicensed radio frequency spectrum band) for the duration indicated by the NAV 625. During the NAV 625, the first node may implement the second access protocol, which second access protocol may include an LBT protocol, and perform a CCA 635. Assuming that nodes transmitting over the wireless communication medium (e.g., the unlicensed radio frequency spectrum band) have detected the CTS2S signal(s) (e.g., the first CTS2S signal 620-a, the second CTS2S signal 620-b, or the third CTS2S signal 620-c) transmitted by the first node, the wireless communication medium (e.g., the unlicensed radio frequency spectrum band) should be clear, and the CCA 635 should be successful. When the CCA 635 is successful, the first node may transmit over the wireless communication medium (e.g., the unlicensed radio frequency spectrum band) during the next LBT frame 630.

In some examples, the duration of the reservation time period specified by the NAV 625 may be increased to include the entirety of the next LBT frame 630. A reservation time period of longer duration may be useful, for example, when another node is not transmitting at a high enough energy to interfere with the first node's access to the wireless communication medium (e.g., the unlicensed radio frequency spectrum band), but is transmitting at a high enough energy to interfere with the transmissions from or transmissions to the first node. When the first node includes an LTE/LTE-A eNB or LTE/LTE-A base station, feedback from UEs (e.g., CQIs) may be used to determine the duration indicated by the NAV 625.

Figure 7:
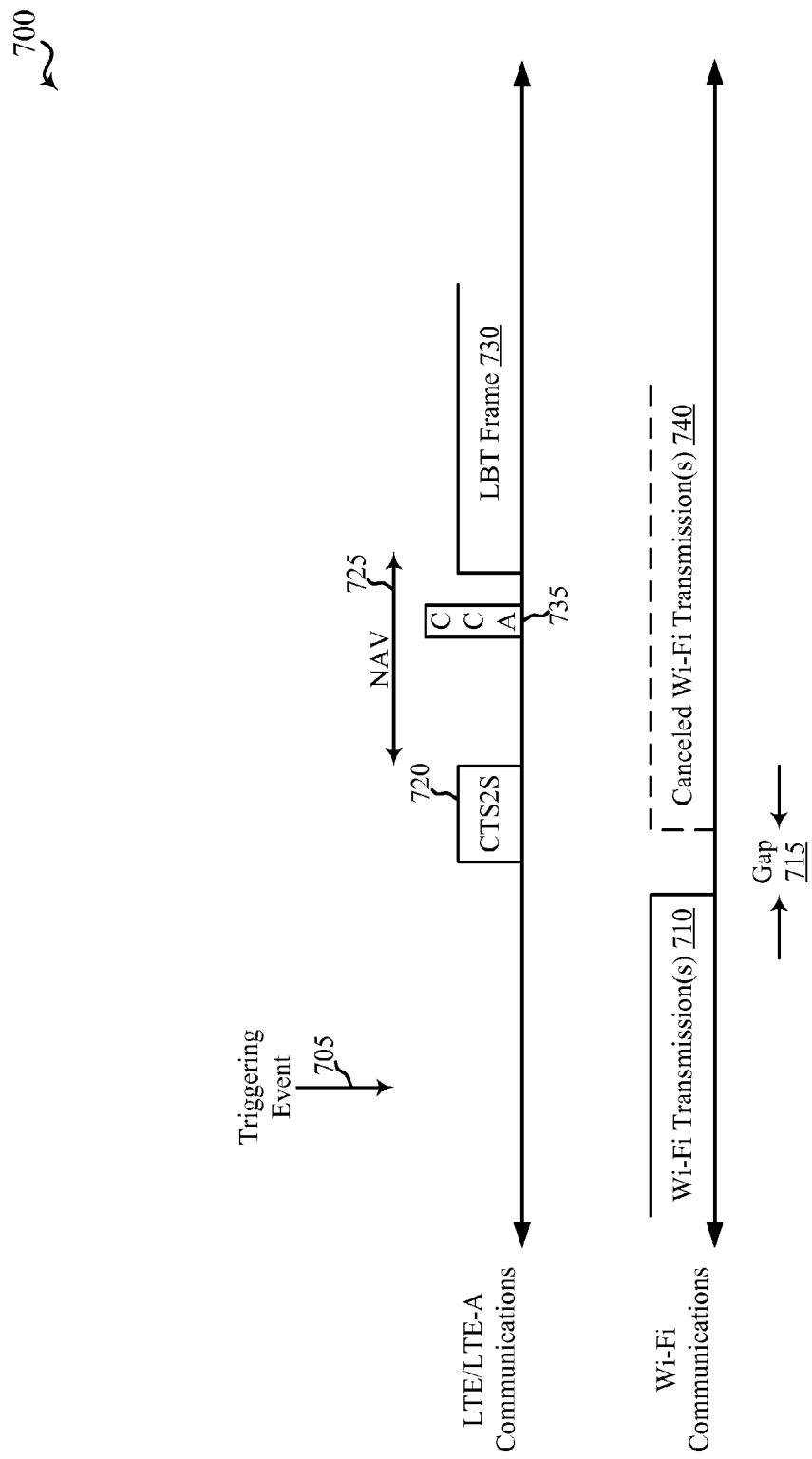
FIG. 7 shows a timeline of parallel LTE/LTE-A communications and Wi-Fi communications over a wireless communication medium (e.g., an unlicensed radio frequency spectrum band) shared by a plurality of nodes, in accordance with various aspects of the present disclosure.

FIG. 7 shows a timeline 700 of parallel LTE/LTE-A communications and Wi-Fi communications over a wireless communication medium (e.g., an unlicensed radio frequency spectrum band) shared by a plurality of nodes, in accordance with various aspects of the present disclosure. The wireless communication medium (e.g., the unlicensed radio frequency spectrum band) may be a radio frequency spectrum band for which apparatuses may need to contend for access, at least in part, for unlicensed use (e.g., Wi-Fi use) or LTE/LTE-A use in an unlicensed radio frequency spectrum band. By way of example, the LTE/LTE-A communications over the wireless communication medium (e.g., the unlicensed radio frequency spectrum band) may include transmissions by a first node (e.g., an LTE/LTE-A eNB or LTE/LTE-A base station), and the Wi-Fi communications over the wireless communication medium (e.g., the unlicensed radio frequency spectrum band) may include transmissions by at least a second node (e.g., one or more Wi-Fi access points).

Prior to the triggering event 705, the first node may implement a first access protocol to contend for access to the wireless communication medium (e.g., the unlicensed radio frequency spectrum band). However, differences in the protocols implemented by the first node and at least the second node or asynchronous operation of the first node and at least the second node, for example, may prevent the first node from accessing the wireless communication medium (e.g., the unlicensed radio frequency spectrum band). The first node may therefore determine whether a triggering event has occurred, as described, for example, with reference to FIG. 5. The triggering event may occur at a time when Wi-Fi transmissions 710 are being made over the wireless communication medium (e.g., the unlicensed radio frequency spectrum band). The triggering event may also occur at a time when other transmissions or no transmissions are being made over the wireless communication medium (e.g., the unlicensed radio frequency spectrum band).

Upon determining that the triggering event 705 has occurred, the first node may implement a second access protocol. In some examples, the second access protocol may include the first node waiting to detect a gap 715 in the transmissions of at least the second node. The gap 715 may be a gap between Wi-Fi data packet transmissions. In some examples, the gap 715 may have a duration shorter than a Distributed Coordination Function (DCF) Interframe Space (DIFS) duration, a Point Coordination Function (PCF) Interframe Space (PIFS) duration, or an Extended Interframe Space (EIFS) duration. In some examples, the gap 715 may have a duration equal to or approximately equal to a Short Interframe Space (SIFS) duration, or have a duration between a SIFS duration and a DIFS duration.

Upon detecting the gap 715, and in some examples, one or more CTS2S signals, such as a CTS2S signal 720, may be transmitted over the wireless communication medium (e.g., the unlicensed radio frequency spectrum band). Detection of the CTS2S signal(s) by at least the second node may cause at least the second node to discontinue transmissions over, refrain from transmitting over, or fail contention for access to, the wireless communication medium (e.g., the unlicensed radio frequency spectrum band), and may cause at least the second node to cancel Wi-Fi transmissions 740 scheduled for transmission after the gap 715.

In some examples, each CTS2S signal may include an NAV specifying a reservation time period of the wireless communication medium (e.g., the unlicensed radio frequency spectrum band). As shown in FIG. 7, the CTS2S signal 720 may include an NAV 725 specifying a reservation time period of the wireless communication medium (e.g., the unlicensed radio frequency spectrum band) extending until a next LBT frame 730. Wi-Fi access points may read the NAV 725 and refrain from transmitting over the wireless communication medium (e.g., the unlicensed radio frequency spectrum band) for the duration indicated by the NAV 725. During the NAV 725, the first node may implement the second access protocol, which second access protocol may include an LBT protocol, and perform a CCA 735. Assuming that nodes transmitting over the wireless communication medium (e.g., the unlicensed radio frequency spectrum band) have detected the CTS2S signal(s) (e.g., the first CTS2S signal 720) transmitted by the first node, the wireless communication medium (e.g., the unlicensed radio frequency spectrum band) should be clear, and the CCA 735 should be successful. When the CCA 735 is successful, the first node may transmit over the wireless communication medium (e.g., the unlicensed radio frequency spectrum band) during the next LBT frame 730.

In some examples, the duration of the reservation time period specified by the NAV 725 may be increased to include the entirety of the next LBT frame 730. A reservation time period of longer duration may be useful, for example, when another node is not transmitting at a high enough energy to interfere with the first node's access to the wireless communication medium (e.g., the unlicensed radio frequency spectrum band), but is transmitting at a high enough energy to interfere with the transmissions from or transmissions to the first node. When the first node includes an LTE/LTE-A eNB or LTE/LTE-A base station, feedback from UEs (e.g., CQIs) may be used to determine the duration indicated by the NAV 725.

Figure 8:
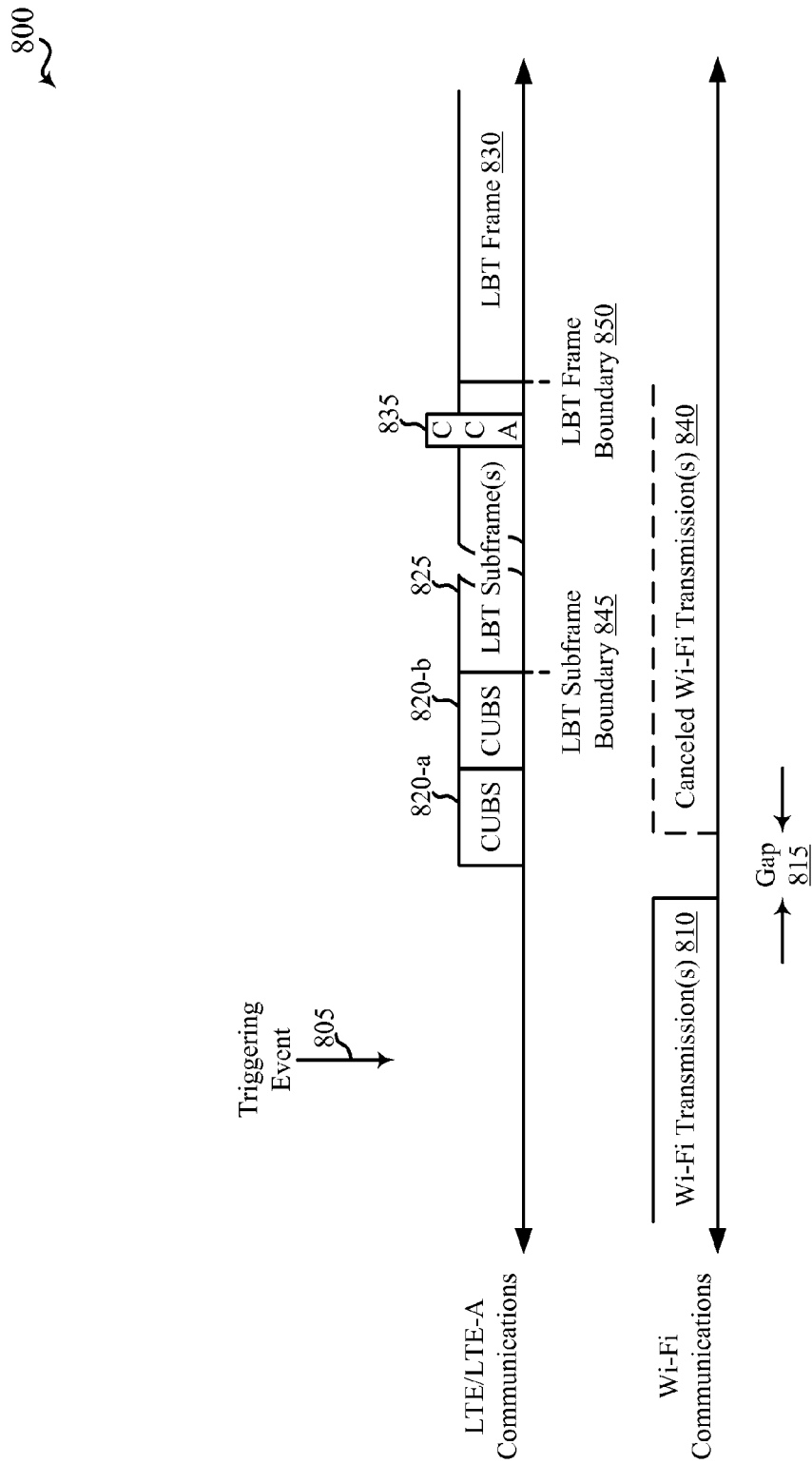
FIG. 8 shows a timeline of parallel LTE/LTE-A communications and Wi-Fi communications over a wireless communication medium (e.g., an unlicensed radio frequency spectrum band) shared by a plurality of nodes, in accordance with various aspects of the present disclosure.

FIG. 8 shows a timeline 800 of parallel LTE/LTE-A communications and Wi-Fi communications over a wireless communication medium (e.g., an unlicensed radio frequency spectrum band) shared by a plurality of nodes, in accordance with various aspects of the present disclosure. The wireless communication medium (e.g., the unlicensed radio frequency spectrum band) may be a radio frequency spectrum band for which apparatuses may need to contend for access, at least in part, for unlicensed use (e.g., Wi-Fi use) or LTE/LTE-A use in an unlicensed radio frequency spectrum band. By way of example, the LTE/LTE-A communications over the wireless communication medium (e.g., the unlicensed radio frequency spectrum band) may include transmissions by a first node (e.g., an LTE/LTE-A eNB or LTE/LTE-A base station), and the Wi-Fi communications over the wireless communication medium (e.g., the unlicensed radio frequency spectrum band) may include transmissions by at least a second node (e.g., one or more Wi-Fi access points).

Prior to the triggering event 805, the first node may implement a first access protocol to contend for access to the wireless communication medium (e.g., the unlicensed radio frequency spectrum band). However, differences in the protocols implemented by the first node and at least the second node or asynchronous operation of the first node and at least the second node, for example, may prevent the first node from accessing the wireless communication medium (e.g., the unlicensed radio frequency spectrum band). The first node may therefore determine whether a triggering event has occurred, as described, for example, with reference to FIG. 5. The triggering event may occur at a time when Wi-Fi transmissions 810 are being made over the wireless communication medium (e.g., the unlicensed radio frequency spectrum band). The triggering event may also occur at a time when other transmissions or no transmissions are being made over the wireless communication medium (e.g., the unlicensed radio frequency spectrum band).

Upon determining that the triggering event 805 has occurred, the first node may implement a second access protocol. In some examples, the second access protocol may include the first node waiting to detect a gap 815 in the transmissions of at least the second node. The gap 815 may be a gap between Wi-Fi data packet transmissions. In some examples, the gap 815 may have a duration shorter than a DIFS duration, a PIFS duration, or an EIFS duration. In some examples, the gap 815 may have a duration equal to or approximately equal to a SIFS duration, or have a duration between a SIFS duration and a DIFS duration.

Upon detecting the gap 815, and in some examples, at least one CUBS, such as a first CUBS 820-*a* and a second CUBS 820-*b*, may be transmitted over the wireless communication medium (e.g., the unlicensed radio frequency spectrum band), as implemented by the second access protocol. Transmission of the CUBS may begin during the gap 815 and continue to a start of a next subframe of an LBT frame (e.g., the CUBS may continue to the LBT subframe boundary 845. Detection of the CUBS signal(s) by at least the second node may cause at least the second node to discontinue transmissions over, refrain from transmitting over, or fail contention for access to, the wireless communication medium (e.g., the unlicensed radio frequency spectrum band), and may cause at least the second node to cancel Wi-Fi transmissions 840 scheduled for transmission after the gap 815.

Beginning after the transmission of the CUBS (e.g., the first CUBS 820-*a* and the second CUBS 820-*b*) and continuing to a start of a next LBT frame 830, the first node may transmit at least one LTE/LTE-A subframe (e.g., one or more LBT subframes 825 may be transmitted between the LBT subframe boundary 845 and the LBT frame boundary 850). Detection of the one or more LBT subframes 825 by at least the second node may cause at least the second node to discontinue transmissions over, refrain from transmitting over, or fail contention for access to, the wireless communication medium (e.g., the unlicensed radio frequency spectrum band).

Assuming that nodes transmitting over the wireless communication medium (e.g., the unlicensed radio frequency spectrum band) have detected the at least one CUBS (e.g., the first CUBS 820-*a* and the second CUBS 820-*b*) and the one or more LBT subframes 825 transmitted by the first node, the wireless communication medium (e.g., the unlicensed radio frequency spectrum band) should be clear, and the CCA 835 should be successful. When the CCA 835 is successful, the first node may transmit over the wireless communication medium (e.g., the unlicensed radio frequency spectrum band) during the LBT frame 830.

Figure 9:
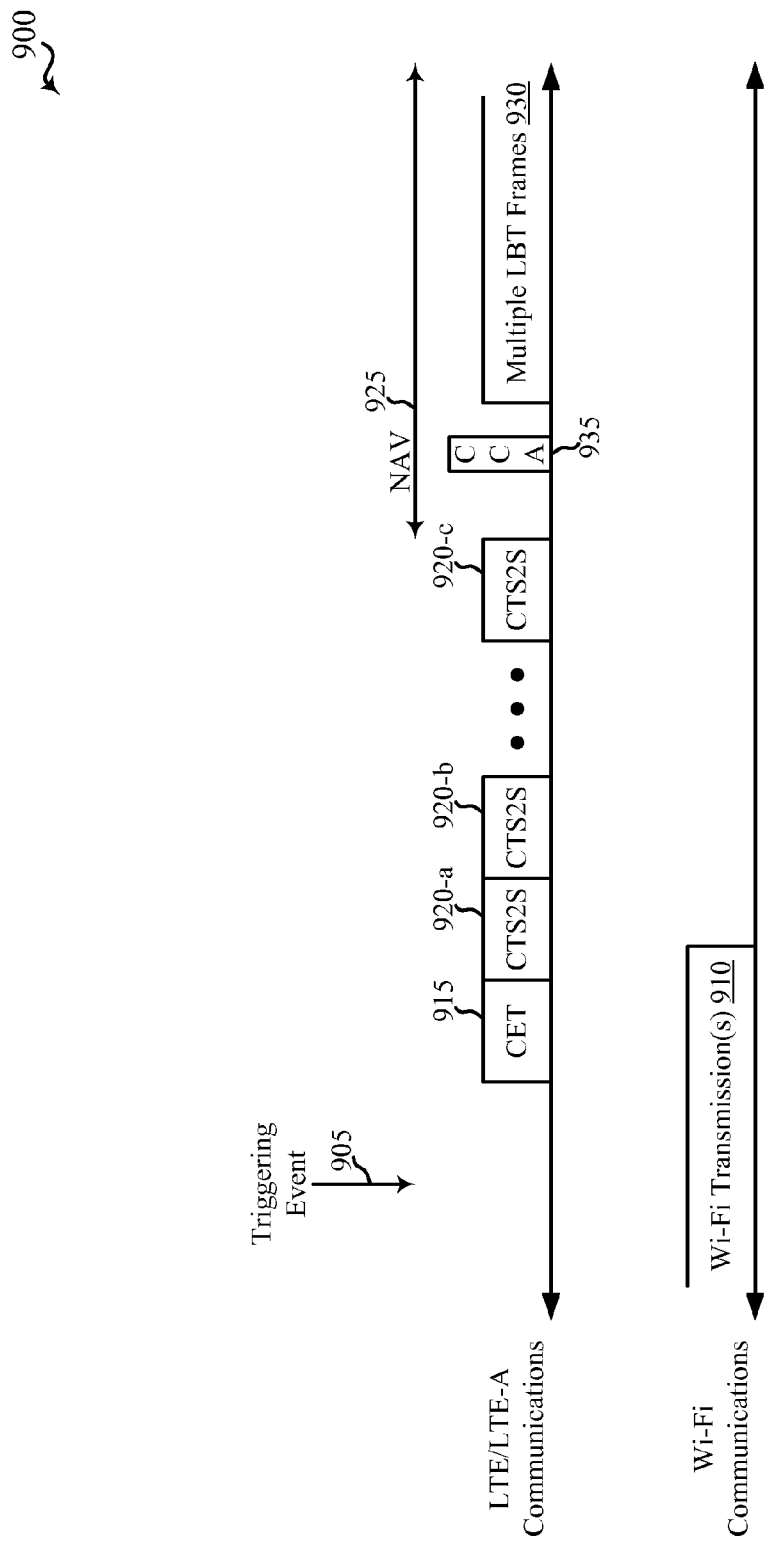
FIG. 9 shows a timeline of parallel LTE/LTE-A communications and Wi-Fi communications over a wireless communication medium (e.g., an unlicensed radio frequency spectrum band) shared by a plurality of nodes, in accordance with various aspects of the present disclosure.

FIG. 9 shows a timeline 900 of parallel LTE/LTE-A communications and Wi-Fi communications over a wireless communication medium (e.g., an unlicensed radio frequency spectrum band) shared by a plurality of nodes, in accordance with various aspects of the present disclosure. The wireless communication medium (e.g., the unlicensed radio frequency spectrum band) may be a radio frequency spectrum band for which apparatuses may need to contend for access, at least in part, for unlicensed use (e.g., Wi-Fi use) or LTE/LTE-A use in an unlicensed radio frequency spectrum band. By way of example, the LTE/LTE-A communications over the wireless communication medium (e.g., the unlicensed radio frequency spectrum band) may include transmissions by a first node (e.g., an LTE/LTE-A eNB or LTE/LTE-A base station), and the Wi-Fi communications over the wireless communication medium (e.g., the unlicensed radio frequency spectrum band) may include transmissions by at least a second node (e.g., one or more Wi-Fi access points).

Prior to the triggering event 905, the first node may implement a first access protocol to contend for access to the wireless communication medium (e.g., the unlicensed radio frequency spectrum band). However, differences in the protocols implemented by the first node and at least the second node or asynchronous operation of the first node and at least the second node, for example, may prevent the first node from accessing the wireless communication medium (e.g., the unlicensed radio frequency spectrum band). The first node may therefore determine whether a triggering event has occurred, as described, for example, with reference to FIG. 5. The triggering event may occur at a time when Wi-Fi transmissions 910 are being made over the wireless communication medium (e.g., the unlicensed radio frequency spectrum band). The triggering event may also occur at a time when other transmissions or no transmissions are being made over the wireless communication medium (e.g., the unlicensed radio frequency spectrum band).

Upon determining that the triggering event 905 has occurred, the first node may implement a second access protocol. In some examples, the second access protocol may include the first node waiting for the transmission of a CET 915 by the first node. The CET 915 may be transmitted by the first node without contending for access to the wireless communication medium (e.g., the unlicensed radio frequency spectrum band). In some examples, the CET 915 may be transmitted to facilitate node discovery, to transmit control or management signals, or for other purposes.

In some examples, a maximum duration or duty cycle of the CET 915 may exceed an actual duration or duty cycle of the CET 915. For example, a maximum duty cycle of the CET 915 may be five percent (5%) of any 50 millisecond window (providing a maximum duration of 2.5 milliseconds every 50 milliseconds), but an actual duration of the CET 915 may be four OFDM symbols (e.g., approximately 290 microseconds) every 80 milliseconds. In some examples, the unused portion of the maximum duration or duty cycle of the CET 915 may be used to transmit one or more Clear-to-Send (CTS)-to-self (CTS-to-self or CTS2S) signals, such as a first CTS2S signal 920-a, a second CTS2S signal 920-b, or a third CTS2S signal 920-c. Detection of the CTS2S signal(s) by at least the second node may cause at least the second node to discontinue transmissions over, refrain from transmitting over, or fail contention for access to, the wireless communication medium (e.g., the unlicensed radio frequency spectrum band).

Moreover, the decision to send one or more CTS2S signals may be based on how much of the duty cycle the first node (or other nodes that include LTE/LTE-A devices) wants to share with nearby Wi-Fi nodes. In one example, if the first node detects only one nearby Wi-Fi transmitter, with wireless communication medium utilization above a threshold, the first node may decide to transmit CTS2S signals with a probability that guarantees 50% wireless communication medium utilization. In addition to (or instead of) wireless communication medium utilization, the first node may employ a metric that takes into account the duty cycle or maximum allowable time in which the first node is blocked from accessing the wireless communication medium by one or more Wi-Fi devices, and adjust the frequency/pattern of CTS2S signal transmissions based at least in part on this metric. In some examples, and when the first node discovers N Wi-Fi nodes in its vicinity, the first node may select the CTS2S signal frequency/pattern to guarantee fair sharing of the wireless communication medium with the N Wi-Fi nodes, based at least in part on their traffic pattern(s) and proximity to the first node.

When CTS2S signals are transmitted in a deterministic manner (e.g., one after another), a number of randomization techniques may be employed to ensure that CTS2S signals transmitted by more than one first node may be received and properly decoded by one or more second nodes.

In some examples, each CTS2S signal may include a Network Allocation Vector (NAV) specifying a reservation time period of the wireless communication medium (e.g., the unlicensed radio frequency spectrum band). As shown in FIG. 9, a last CTS2S signal 920-c to be transmitted following the CET 915 may include an NAV 925 specifying a reservation time period of the wireless communication medium (e.g., the unlicensed radio frequency spectrum band) extending across a plurality of next LBT frames 930. Wi-Fi access points may read the NAV 925 and refrain from transmitting over the wireless communication medium (e.g., the unlicensed radio frequency spectrum band) for the duration indicated by the NAV 925, giving the first node a higher probability that it may successfully contend for access to the wireless communication medium during the multiple next LBT frames 930. During the NAV 925, the first node may implement the second access protocol, which may include an LBT protocol, and perform a first CCA 935 for a first LBT frame of the multiple next LBT frames 930, as well as additional CCAs for additional LBT frames of the multiple next LBT frames 930. Assuming that nodes transmitting over the wireless communication medium (e.g., the unlicensed radio frequency spectrum band) have detected the CTS2S signal(s) (e.g., the first CTS2S signal 920-a, the second CTS2S signal 920-b, or the third CTS2S signal 920-c) transmitted by the first node, the wireless communication medium (e.g., the unlicensed radio frequency spectrum band) should be clear, and the first CCA 935 should be successful. When the first CCA 935 is successful, the first node may transmit over the wireless communication medium (e.g., the unlicensed radio frequency spectrum band) during the first LBT frame of the multiple next LBT frames 930.

In some examples, the duration indicated by the NAV 925 may be selected based on past performance of the first node in successfully contending for access to the wireless communication medium (e.g., the unlicensed radio frequency spectrum band).

In some examples, a CTS2S signal including an NAV specifying a reservation time period of the wireless communication medium (e.g., the unlicensed radio frequency spectrum band) across multiple LBT frames may be used in place of the CTS2S signal 720 described with reference to FIG. 7. For example, when the first node has been able to successfully contend for access to the wireless communication medium with a success rate above a first threshold, the reservation time period may include only a single LBT frame. However, when the first node has not been able to successfully contend for access to the wireless communication medium with a success rate above the first threshold (or when the first node has not been able to successfully contend for access to the wireless communication medium with a success rate above a second threshold, which second threshold is lower than the first threshold), the reservation time period may include multiple LBT frames.

As an alternative to a CTS2S signal including an NAV specifying a longer reservation time period of the wireless communication medium (e.g., the unlicensed radio frequency spectrum band), at least one CTS2S signal may be transmitted during a silent period or guard period of an LBT frame. The at least one CTS2S signal may include an NAV that specifies a reservation time period of the wireless communication medium (e.g., the unlicensed radio frequency spectrum band) until the next LBT frame (or until the end of the silent period or guard period of the LBT frame.

In examples in which a first LTE/LTE-A base station is being denied access to a wireless communication medium (e.g., an unlicensed radio frequency spectrum band) as a result of transmissions by a second LTE/LTE-A base station operating asynchronously to the first LTE/LTE-A base station, a CTS2S signal transmitted by the first LTE/LTE-A base station may in some examples be received by a Wi-Fi access point that is co-located with the second LTE/LTE-A base station, and the Wi-Fi access point may read an NAV associated with the CTS2S signal and inform the second LTE/LTE-A base station of the duration of the reservation time period specified by the NAV. Alternately, the first LTE/LTE-A base station may transmit a Wi-Fi beacon, which may cause the second LTE/LTE-A base station to switch to a different channel or adopt a lower transmission duty cycle on the same channel. In either example, the response of the second LTE/LTE-A base station may enable the first LTE/LTE-A base station to successfully contend for access to the wireless communication medium.

Figure 10:
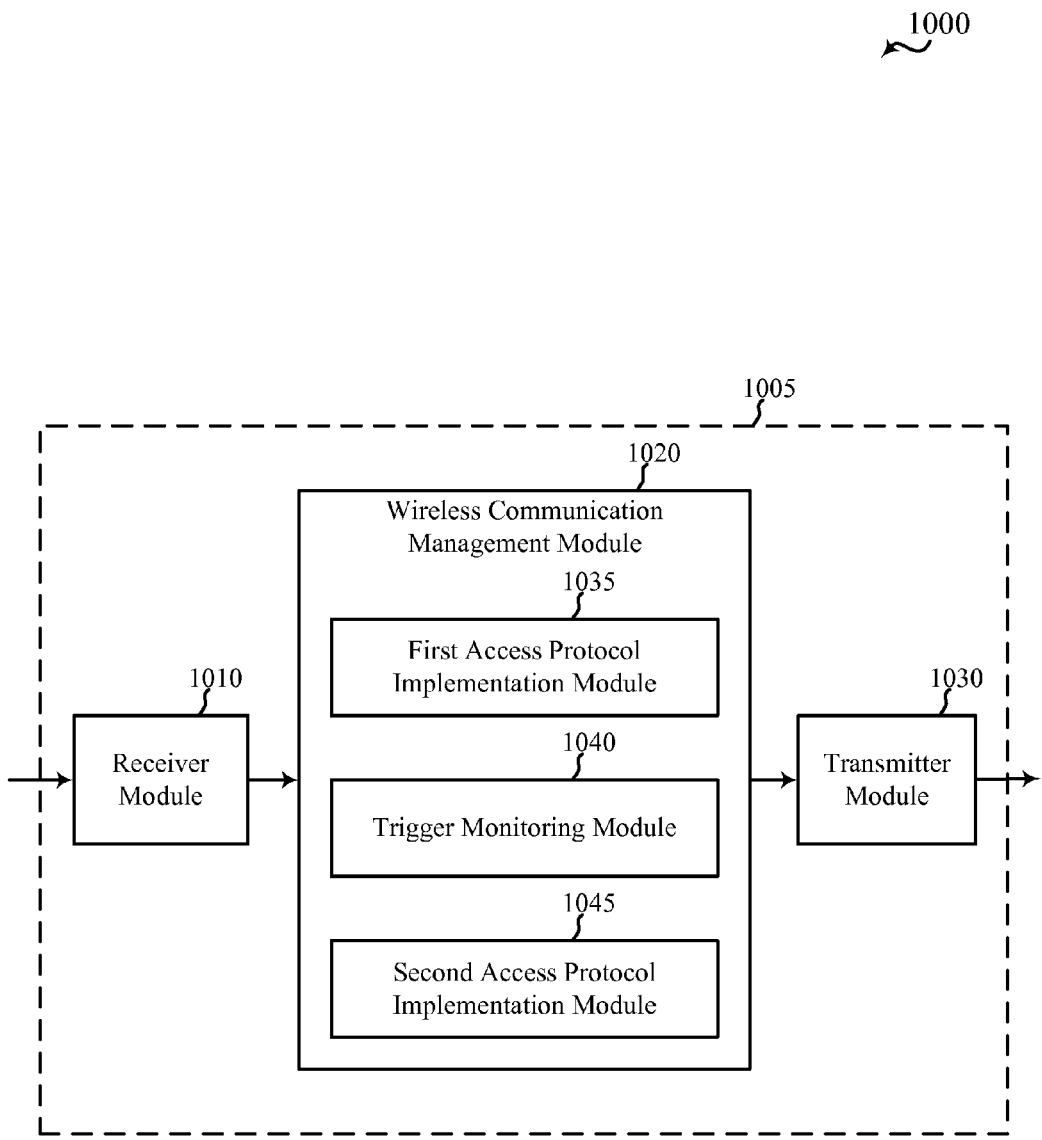
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105, 205, 205-a, 505, or 505-a described with reference to FIG. 1, 2, or 5, or an example of aspects of one or more of the UEs 115, 215-a, 215-b, 215-c, or 515 described with reference to FIG. 1, 2, or 5. In some examples, the apparatus 1005 may be part of a first node including an LTE/LTE-A eNB or LTE/LTE-A base station. In some examples, the apparatus 1005 may be an LTE/LTE-A eNB or LTE/LTE-A base station. The apparatus 1005 may also be a processor. The apparatus 1005 may include a receiver module 1010, a wireless communication management module 1020, or a transmitter module 1030. Each of these components may be in communication with each other.

The components of the apparatus 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may include at least one radio frequency (RF) receiver, such as at least one RF receiver operable to receive transmissions over one or more wireless communication mediums, such as a licensed radio frequency spectrum band (e.g., a radio frequency spectrum band for which apparatuses do not contend for access because the radio frequency spectrum band is licensed to certain users (e.g., LTE/LTE-A users) for certain uses) or an unlicensed radio frequency spectrum band (e.g., a radio frequency spectrum band for which apparatuses may need to contend for access, at least in part, for unlicensed use (e.g., Wi-Fi use) or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, or 9. The receiver module 1010 may be used to receive various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the transmitter module 1030 may include at least one RF transmitter, such as at least one RF transmitter operable to transmit over one or more wireless communication mediums, such as the licensed radio frequency spectrum band or the unlicensed radio frequency spectrum band. The transmitter module 1030 may be used to transmit various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the wireless communication management module 1020 may be used to manage various aspects of wireless communication with other apparatuses and include a first access protocol implementation module 1035, a trigger monitoring module 1040, or a second access protocol implementation module 1045.

In some examples, the first access protocol implementation module 1035 may be used to implement, at a first node including the apparatus 1005, a first access protocol to contend for access to a wireless communication medium shared by a plurality of nodes. In some examples, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band.

In some examples, the plurality of nodes may include one or more LTE/LTE-A eNBs or LTE/LTE-A base stations operating outside the first node, or one or more Wi-Fi access points operating outside the first node. In some examples, one or more of the plurality of nodes (or one or more of the LTE/LTE-A eNBs or LTE/LTE-A base stations in the plurality of nodes) may operate asynchronously to the first node (or asynchronously to an LTE/LTE-A eNBs or LTE/LTE-A base station of the first node).

In some examples, the trigger monitoring module 1040 may be used to determine whether a first triggering event has occurred while the first access protocol implementation module 1035 is implementing the first access protocol. When it is determined that the first triggering event has not occurred, the first access protocol implementation module 1035 may continue to implement the first access protocol. When it is determined that the first triggering event has occurred, and based at least in part on the determination that the first triggering event has occurred, the second access protocol implementation module 1045 may implement a second access protocol to contend for access to the wireless communication medium.

In some examples, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the trigger monitoring module 1040 may determine the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

In some examples, the second access protocol implementation module 1045 may be used to implement, at the first node, a second access protocol to contend for access to the wireless communication medium.

In some examples, the trigger monitoring module 1040 may also be used to determine whether a second triggering event has occurred while the second access protocol implementation module 1045 is implementing the second access protocol. When it is determined that the second triggering event has not occurred, the second access protocol implementation module 1045 may continue to implement the second access protocol. When it is determined that the second triggering event has occurred, and based at least in part on the determination that the second triggering event has occurred, the first access protocol implementation module 1035 may implement the first access protocol to contend for access to the wireless communication medium.

In some examples, the second triggering event may be an absence of the first triggering event.

Figure 11:
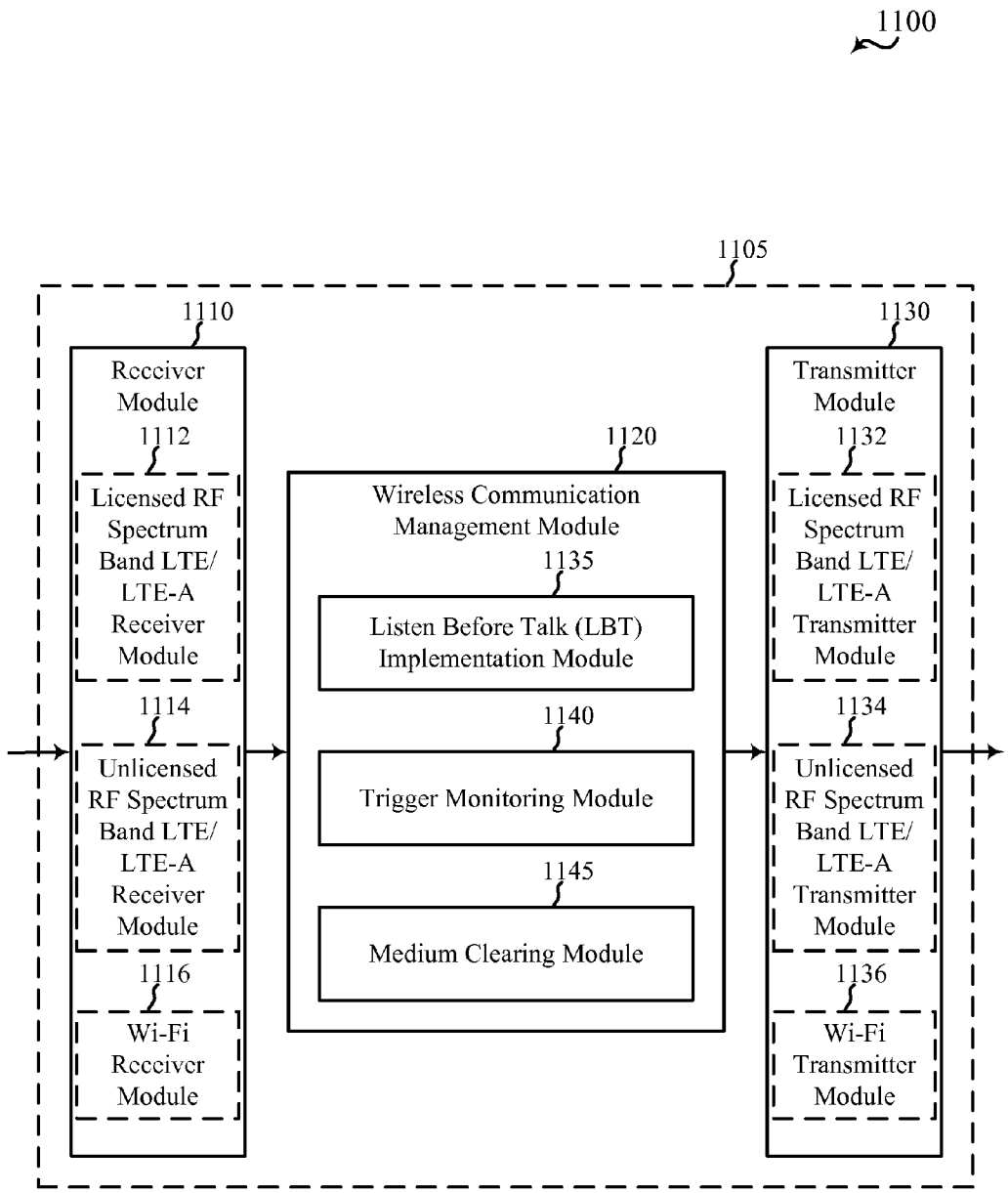
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the base stations 105, 205, 205-*a*, 505, or 505-*a* described with reference to FIG. 1, 2, or 5, an example of aspects of one or more of the UEs 115, 215-*a*, 215-*b*, 215-*c*, or 515 described with reference to FIG. 1, 2, or 5, or an example of the apparatus 1005 described with reference to FIG. 10. In some examples, the apparatus 1105 may be part of a first node including an LTE/LTE-A eNB or LTE/LTE-A base station. In some examples, the apparatus 1105 may be an LTE/LTE-A eNB or LTE/LTE-A base station. The apparatus 1105 may also be a processor. The apparatus 1105 may include a receiver module 1110, a wireless communication management module 1120, or a transmitter module 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be an example of one or more aspects of the receiver module 1010 described with reference to FIG. 10. In some examples, the receiver module 1110 may include at least one radio frequency (RF) receiver, such as at least one RF receiver operable to receive transmissions over one or more wireless communication mediums, such as a licensed radio frequency spectrum band (e.g., a radio frequency spectrum band for which apparatuses do not contend for access because the radio frequency spectrum band is licensed to certain users (e.g., LTE/LTE-A users) for certain uses) or an unlicensed radio frequency spectrum band (e.g., a radio frequency spectrum band for which apparatuses may need to contend for access, at least in part, for unlicensed use (e.g., Wi-Fi use) or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, 9, or 10. The receiver module 1110 may in some cases include separate receivers for the licensed radio frequency spectrum band and the unlicensed radio frequency spectrum band. The separate receivers may, in some examples, take the form of a licensed RF spectrum band LTE/LTE-A receiver module 1112 for communicating over the licensed radio frequency spectrum band, and an unlicensed RF spectrum band LTE/LTE-A receiver module 1114 for communicating over the unlicensed radio frequency spectrum band. The receiver module 1110 may also include a Wi-Fi receiver module 1116. The receiver module 1110, including the licensed RF spectrum band LTE/LTE-A receiver module 1112, the unlicensed RF spectrum band LTE/LTE-A receiver module 1114, or the Wi-Fi receiver module 1116 may be used to receive various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the transmitter module 1130 may be an example of one or more aspects of the transmitter module 1030 described with reference to FIG. 10. In some examples, the transmitter module 1130 may include at least one RF transmitter, such as at least one RF transmitter operable to transmit over one or more wireless communication mediums, such as the licensed radio frequency spectrum band or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1132 for communicating over the licensed radio frequency spectrum band, and an unlicensed RF spectrum band LTE/LTE-A transmitter module 1134 for communicating over the unlicensed radio frequency spectrum band. The transmitter module 1130 may also include a Wi-Fi transmitter module 1136. The transmitter module 1130, including the licensed RF spectrum band LTE/LTE-A transmitter module 1132, the unlicensed RF spectrum band LTE/LTE-A transmitter module 1134, or the Wi-Fi transmitter module 1136 may be used to transmit various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the wireless communication management module 1120 may be an example of one or more aspects of the wireless communication management module 1020 described with reference to FIG. 10. The wireless communication management module 1120 may include an LBT protocol implementation module 1135, a trigger monitoring module 1140, or a medium clearing module 1145. Each of these components may be in communication with each other.

In some examples, the LBT protocol implementation module 1135 may be used to implement, at a first node including the apparatus 1105, an LBT protocol to contend for access to a wireless communication medium shared by a plurality of nodes. In some examples, the LBT protocol may be a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band.

In some examples, the plurality of nodes may include one or more LTE/LTE-A eNBs or LTE/LTE-A base stations operating outside the first node, or one or more Wi-Fi access points operating outside the first node. In some examples, one or more of the plurality of nodes (or one or more of the LTE/LTE-A eNBs or LTE/LTE-A base stations in the plurality of nodes) may operate asynchronously to the first node (or asynchronously to an LTE/LTE-A eNBs or LTE/LTE-A base station of the first node).

In some examples, the trigger monitoring module 1140 may be used to determine whether a first triggering event has occurred while the LBT protocol implementation module 1135 is implementing the LBT protocol. When it is determined that the first triggering event has not occurred, the LBT protocol implementation module 1135 may continue to implement the LBT protocol. When it is determined that the first triggering event has occurred, the medium clearing module 1145 may be activated.

In some examples, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the trigger monitoring module 1140 may determine the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

In some examples, the medium clearing module 1145 may be used to transmit a signal over the wireless communication medium without contending for access to the wireless communication medium. The signal may be a signal that, when detected by at least a second node of the plurality of nodes, causes at least the second node to discontinue transmissions over, refrain from transmitting over, or fail contention for access to, the wireless communication medium.

In some examples, the signal transmitted by the medium clearing module 1145 may include at least one CTS-to-self signal. In these examples, at least one NAV of the at least one CTS-to-self signal may specify a reservation time period of the wireless communication medium extending until a next LBT frame. When multiple CTS-to-self signals are transmitted, a subsequent CTS-to-self signal may be transmitted immediately following a previous CTS-to-self signal or before the expiration of an NAV of a previous CTS-to-self signal.

In other examples in which at least one CTS-to-self signal is transmitted by the medium clearing module 1145, at least one NAV of the at least one CTS-to-self signal may specify a reservation time period of the wireless communication medium extending across a plurality of LBT frames.

In some examples, the signal transmitted by the medium clearing module 1145 may include at least one Wi-Fi beacon signal.

In some examples, the medium clearing module 1145 may transmit signals (e.g., CTS-to-self signals) over multiple channels of the wireless communication medium. The transmission of signals over multiple channels may be useful, for example, when at least a second node (e.g., a Wi-Fi node) that is proximate to the first node employs channel bonding between multiple channels.

In some examples, the medium clearing module 1145 may adjust a power of the signal it transmits based at least in part on a proximity of at least the second node to the first node to the first node. For example, the medium clearing module 1145 may adjust the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

In some examples, the LBT protocol implementation module 1135 may be used to implement the LBT protocol in combination with one or more transmissions of the signal by the medium clearing module 1145. For example, the LBT protocol implementation module 1135 may implement the LBT protocol following a clearing of the wireless communication medium using the signal transmitted by the medium clearing module 1145.

In some examples, the LBT protocol implementation module 1135 may continue to operate in combination with the medium clearing module 1145 until it is determined that a fair use of the wireless communication medium has been attained by the first node. In some examples, the continued operation of the medium clearing module 1145 may cause the medium clearing module 1145 to transmit a signal with a periodicity. In some examples, the periodicity may be a periodicity that causes the transmission of the signal to be repeated for adjacent LBT frames. In some examples, the periodicity may be a periodicity that causes the transmission of the signal to be repeated for non-adjacent LBT frames. In some examples, the medium clearing module 1145 may select the periodicity at which the transmission of the signal is repeated based on a number of the plurality of nodes transmitting in proximity to the first node.

Figure 12:
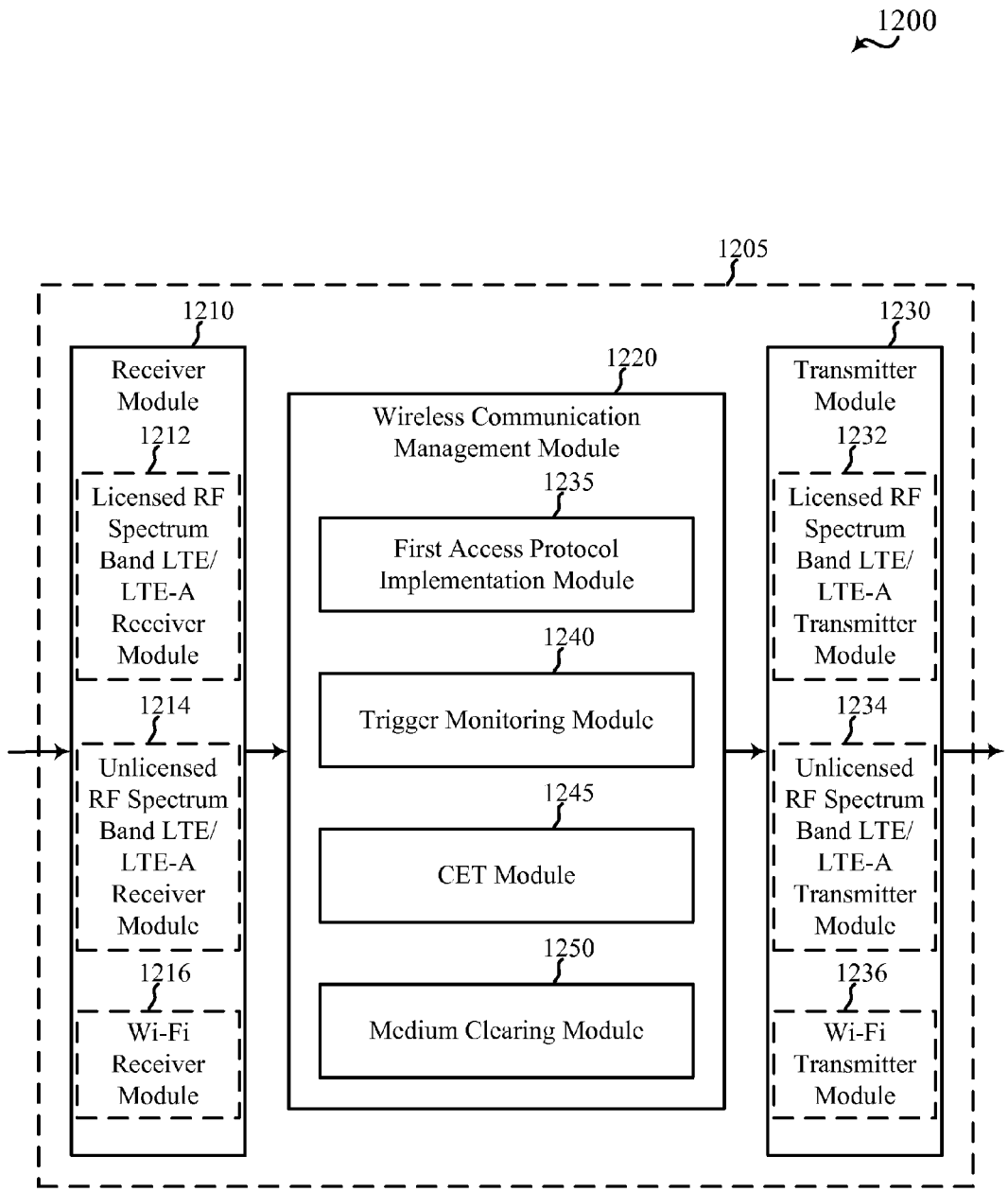
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base stations 105, 205, 205-*a*, 505, or 505-*a* described with reference to FIG. 1, 2, or 5, an example of aspects of one or more of the UEs 115, 215-*a*, 215-*b*, 215-*c*, or 515 described with reference to FIG. 1, 2, or 5, or an example of the apparatus 1005 described with reference to FIG. 10. In some examples, the apparatus 1205 may be part of a first node including an LTE/LTE-A eNB or LTE/LTE-A base station. In some examples, the apparatus 1205 may be an LTE/LTE-A eNB or LTE/LTE-A base station. The apparatus 1205 may also be a processor. The apparatus 1205 may include a receiver module 1210, a wireless communication management module 1220, or a transmitter module 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be an example of one or more aspects of the receiver module 1010 described with reference to FIG. 10. In some examples, the receiver module 1210 may include at least one radio frequency (RF) receiver, such as at least one RF receiver operable to receive transmissions over one or more wireless communication mediums, such as a licensed radio frequency spectrum band (e.g., a radio frequency spectrum band for which apparatuses do not contend for access because the radio frequency spectrum band is licensed to certain users (e.g., LTE/LTE-A users) for certain uses) or an unlicensed radio frequency spectrum band (e.g., a radio frequency spectrum band for which apparatuses may need to contend for access, at least in part, for unlicensed use (e.g., Wi-Fi use) or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, 9, or 10. The receiver module 1210 may in some cases include separate receivers for the licensed radio frequency spectrum band and the unlicensed radio frequency spectrum band. The separate receivers may, in some examples, take the form of a licensed RF spectrum band LTE/LTE-A receiver module 1212 for communicating over the licensed radio frequency spectrum band, and an unlicensed RF spectrum band LTE/LTE-A receiver module 1214 for communicating over the unlicensed radio frequency spectrum band. The receiver module 1210 may also include a Wi-Fi receiver module 1216. The receiver module 1210, including the licensed RF spectrum band LTE/LTE-A receiver module 1212, the unlicensed RF spectrum band LTE/LTE-A receiver module 1214, or the Wi-Fi receiver module 1216 may be used to receive various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the transmitter module 1230 may be an example of one or more aspects of the transmitter module 1030 described with reference to FIG. 10. In some examples, the transmitter module 1230 may include at least one RF transmitter, such as at least one RF transmitter operable to transmit over one or more wireless communication mediums, such as the licensed radio frequency spectrum band or the unlicensed radio frequency spectrum band. The transmitter module 1230 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1232 for communicating over the licensed radio frequency spectrum band, and an unlicensed RF spectrum band LTE/LTE-A transmitter module 1234 for communicating over the unlicensed radio frequency spectrum band. The transmitter module 1230 may also include a Wi-Fi transmitter module 1236. The transmitter module 1230, including the licensed RF spectrum band LTE/LTE-A transmitter module 1232, the unlicensed RF spectrum band LTE/LTE-A transmitter module 1234, or the Wi-Fi transmitter module 1236 may be used to transmit various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the wireless communication management module 1220 may be an example of one or more aspects of the wireless communication management module 1020 described with reference to FIG. 10. The wireless communication management module 1220 may include a first access protocol implementation module 1235, a trigger monitoring module 1240, a CET module 1245, or a medium clearing module 1250. Each of these components may be in communication with each other.

In some examples, the first access protocol implementation module 1235 may be used to implement, at a first node including the apparatus 1205, a first access protocol to contend for access to a wireless communication medium shared by a plurality of nodes. In some examples, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band.

In some examples, the plurality of nodes may include one or more LTE/LTE-A eNBs or LTE/LTE-A base stations operating outside the first node, or one or more Wi-Fi access points operating outside the first node. In some examples, one or more of the plurality of nodes (or one or more of the LTE/LTE-A eNBs or LTE/LTE-A base stations in the plurality of nodes) may operate asynchronously to the first node (or asynchronously to an LTE/LTE-A eNBs or LTE/LTE-A base station of the first node).

In some examples, the trigger monitoring module 1240 may be used to determine whether a first triggering event has occurred while the first access protocol implementation module 1235 is implementing the LBT protocol. When it is determined that the first triggering event has not occurred, the first access protocol implementation module 1235 may continue to implement the first access protocol. When it is determined that the first triggering event has occurred, the medium clearing module 1250 may be activated.

In some examples, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the trigger monitoring module 1240 may determine the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

In some examples, the CET module 1245 may be used by the first node to transmit CETs over the wireless communication medium. In some examples, the CETs may be transmitted to facilitate node discovery, to transmit control or management signals, or for other purposes.

In some examples, the medium clearing module 1250 may be used to transmit a signal over the wireless communication medium without contending for access to the wireless communication medium. The signal may be transmitted over the wireless communication medium following the transmission of a CET by the CET module 1245.

In some examples, the signal transmitted by the medium clearing module 1250 may include at least one CTS-to-self signal. In these examples, at least one NAV of the at least one CTS-to-self signal may specify a reservation time period of the wireless communication medium extending until a next LBT frame. When multiple CTS-to-self signals are transmitted, a subsequent CTS-to-self signal may be transmitted immediately following a previous CTS-to-self signal or before the expiration of an NAV of a previous CTS-to-self signal.

In other examples in which at least one CTS-to-self signal is transmitted by the medium clearing module 1250, at least one NAV of the at least one CTS-to-self signal may specify a reservation time period of the wireless communication medium extending across a plurality of LBT frames.

In some examples, the signal transmitted by the medium clearing module 1250 may include at least one Wi-Fi beacon signal.

In some examples, the medium clearing module 1250 may transmit signals (e.g., CTS-to-self signals) over multiple channels of the wireless communication medium. The transmission of signals over multiple channels may be useful, for example, when at least a second node (e.g., a Wi-Fi node) that is proximate to the first node employs channel bonding between multiple channels.

In some examples, the medium clearing module 1250 may adjust a power of the signal it transmits based at least in part on a proximity of at least the second node to the first node to the first node. For example, the medium clearing module 1250 may adjust the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

In some examples, the first access protocol implementation module 1235 may be used to implement an LBT protocol in combination with one or more transmissions of the signal by the medium clearing module 1250. For example, the first access protocol implementation module 1235 may implement the LBT protocol following a clearing of the wireless communication medium using the signal transmitted by the medium clearing module 1250.

In some examples, the first access protocol implementation module 1235 may continue to operate in combination with the medium clearing module 1250 until it is determined that a fair use of the wireless communication medium has been attained by the first node. In some examples, the continued operation of the medium clearing module 1250 may cause the medium clearing module 1250 to transmit a signal with a periodicity. In some examples, the periodicity may be a periodicity that causes the transmission of the signal to be repeated for adjacent LBT frames. In some examples, the periodicity may be a periodicity that causes the transmission of the signal to be repeated for non-adjacent LBT frames. In some examples, the medium clearing module 1250 may select the periodicity at which the transmission of the signal is repeated based on a number of the plurality of nodes transmitting in proximity to the first node.

Figure 13:
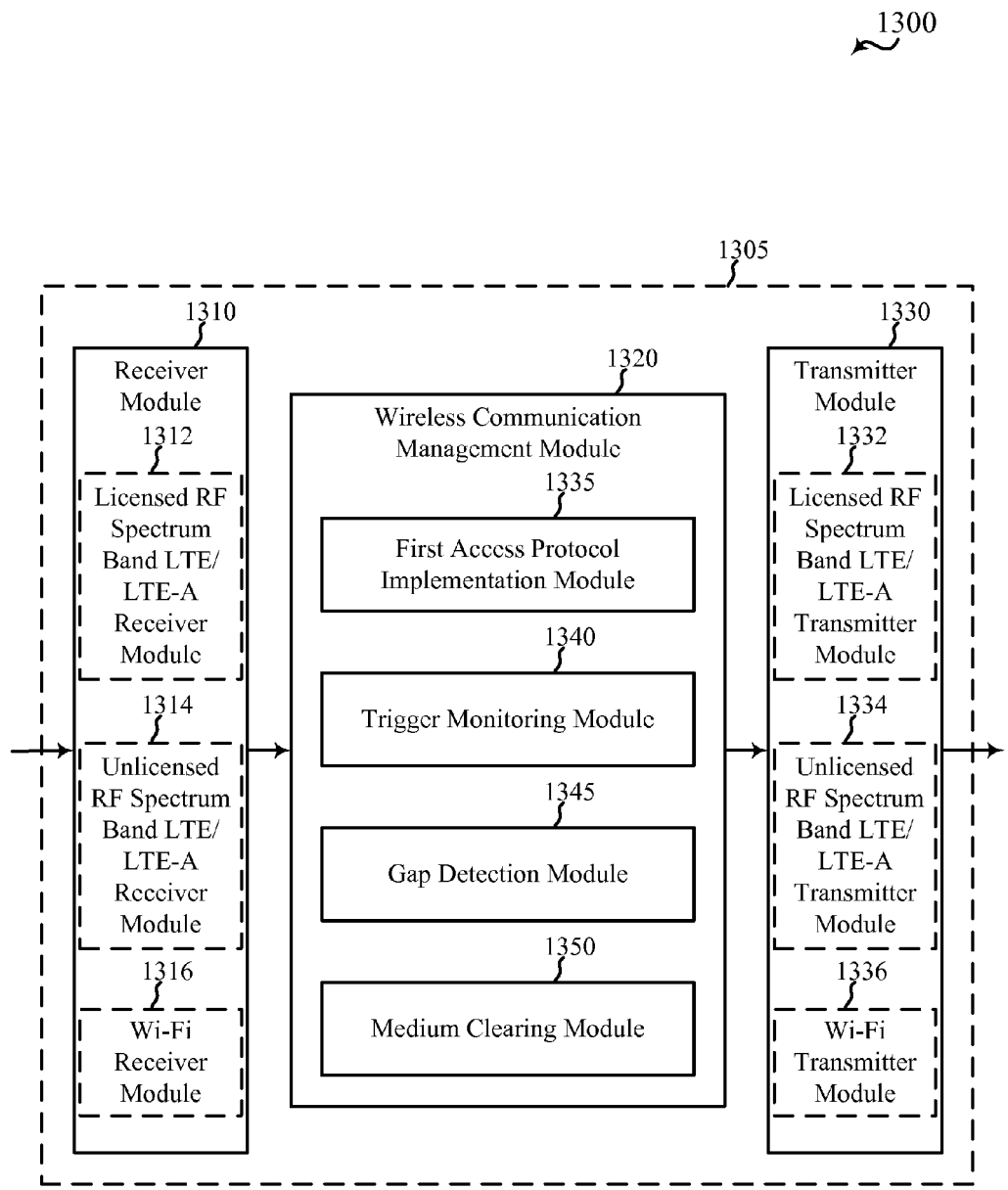
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. In some examples, the apparatus 1305 may be an example of aspects of one or more of the base stations 105, 205, 205-a, 505, or 505-a described with reference to FIG. 1, 2, or 5, an example of aspects of one or more of the UEs 115, 215-a, 215-b, 215-c, or 515 described with reference to FIG. 1, 2, or 5, or an example of the apparatus 1005 described with reference to FIG. 10. In some examples, the apparatus 1305 may be part of a first node including an LTE/LTE-A eNB or LTE/LTE-A base station. In some examples, the apparatus 1305 may be an LTE/LTE-A eNB or LTE/LTE-A base station. The apparatus 1305 may also be a processor. The apparatus 1305 may include a receiver module 1310, a wireless communication management module 1320, or a transmitter module 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be an example of one or more aspects of the receiver module 1010 described with reference to FIG. 10. In some examples, the receiver module 1310 may include at least one radio frequency (RF) receiver, such as at least one RF receiver operable to receive transmissions over one or more wireless communication mediums, such as a licensed radio frequency spectrum band (e.g., a radio frequency spectrum band for which apparatuses do not contend for access because the radio frequency spectrum band is licensed to certain users (e.g., LTE/LTE-A users) for certain uses) or an unlicensed radio frequency spectrum band (e.g., a radio frequency spectrum band for which apparatuses may need to contend for access, at least in part, for unlicensed use (e.g., Wi-Fi use) or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1, 2, 3, 4, 5, 6, 7, 8, 9, or 10. The receiver module 1310 may in some cases include separate receivers for the licensed radio frequency spectrum band and the unlicensed radio frequency spectrum band. The separate receivers may, in some examples, take the form of a licensed RF spectrum band LTE/LTE-A receiver module 1312 for communicating over the licensed radio frequency spectrum band, and an unlicensed RF spectrum band LTE/LTE-A receiver module 1314 for communicating over the unlicensed radio frequency spectrum band. The receiver module 1310 may also include a Wi-Fi receiver module 1316. The receiver module 1310, including the licensed RF spectrum band LTE/LTE-A receiver module 1312, the unlicensed RF spectrum band LTE/LTE-A receiver module 1314, or the Wi-Fi receiver module 1316 may be used to receive various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the transmitter module 1330 may be an example of one or more aspects of the transmitter module 1030 described with reference to FIG. 10. In some examples, the transmitter module 1330 may include at least one RF transmitter, such as at least one RF transmitter operable to transmit over one or more wireless communication mediums, such as the licensed radio frequency spectrum band or the unlicensed radio frequency spectrum band. The transmitter module 1330 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1332 for communicating over the licensed radio frequency spectrum band, and an unlicensed RF spectrum band LTE/LTE-A transmitter module 1334 for communicating over the unlicensed radio frequency spectrum band. The transmitter module 1330 may also include a Wi-Fi transmitter module 1336. The transmitter module 1330, including the licensed RF spectrum band LTE/LTE-A transmitter module 1332, the unlicensed RF spectrum band LTE/LTE-A transmitter module 1334, or the Wi-Fi transmitter module 1336 may be used to transmit various types of data or control signals (i.e., transmissions) over one or more communication links of a wireless communication system, such as one or more communication links of the wireless communication system 100, 200, or 500 described with reference to FIG. 1, 2, or 5. The communication links may be established over the licensed radio frequency spectrum band or the unlicensed radio frequency spectrum band.

In some examples, the wireless communication management module 1320 may be an example of one or more aspects of the wireless communication management module 1020 described with reference to FIG. 10. The wireless communication management module 1320 may include a first access protocol implementation module 1335, a trigger monitoring module 1340, a gap detection module 1345, or a medium clearing module 1350. Each of these components may be in communication with each other.

In some examples, the first access protocol implementation module 1335 may be used to implement, at a first node including the apparatus 1305, a first access protocol to contend for access to a wireless communication medium shared by a plurality of nodes. In some examples, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band.

In some examples, the plurality of nodes may include one or more LTE/LTE-A eNBs or LTE/LTE-A base stations operating outside the first node, or one or more Wi-Fi access points operating outside the first node. In some examples, one or more of the plurality of nodes (or one or more of the LTE/LTE-A eNBs or LTE/LTE-A base stations in the plurality of nodes) may operate asynchronously to the first node (or asynchronously to an LTE/LTE-A eNBs or LTE/LTE-A base station of the first node).

In some examples, the trigger monitoring module 1340 may be used to determine whether a first triggering event has occurred while the first access protocol implementation module 1335 is implementing the LBT protocol. When it is determined that the first triggering event has not occurred, the first access protocol implementation module 1335 may continue to implement the first access protocol. When it is determined that the first triggering event has occurred, the gap detection module 1345 may be activated.

In some examples, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the trigger monitoring module 1340 may determine the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

In some examples, the gap detection module 1345 may be used to detect a gap between transmissions of at least the second node over the wireless communication medium. In some examples, the gap may have a duration shorter than a DIFS duration, a PIFS duration, or an EIFS duration. In some examples, the gap may have a duration equal to or approximately equal to a SIFS duration, or have a duration between a SIFS duration and a DIFS duration.

In some examples, the medium clearing module 1350 may be used to transmit a signal over the wireless communication medium without contending for access to the wireless communication medium. The transmission of the signal over the wireless communication medium may begin during the detected gap between the transmissions. The signal may be a signal that, when detected by at least a second node of the plurality of nodes, causes at least the second node to discontinue transmissions over, refrain from transmitting over, or fail contention for access to, the wireless communication medium.

In some examples, the signal transmitted by the medium clearing module 1350 may include at least one CTS-to-self signal. In these examples, at least one NAV of the at least one CTS-to-self signal may specify a reservation time period of the wireless communication medium extending until a next LBT frame. When multiple CTS-to-self signals are transmitted, a subsequent CTS-to-self signal may be transmitted immediately following a previous CTS-to-self signal or before the expiration of an NAV of a previous CTS-to-self signal.

In other examples in which at least one CTS-to-self signal is transmitted by the medium clearing module 1350, at least one NAV of the at least one CTS-to-self signal may specify a reservation time period of the wireless communication medium extending across a plurality of LBT frames.

In some examples, the signal transmitted by the medium clearing module 1350 may include at least one Wi-Fi beacon signal.

In some examples, the signal transmitted by the medium clearing module 1350 may include at least one CUBS and at least one LTE/LTE-A subframe. The transmission of the at least one CUBS may begin during the gap and continue until a start of a next subframe of an LBT frame. The transmission of the at least one LTE/LTE-A subframe may begin after transmitting the at least one CUBS and continue until a start of a next LBT frame. In some examples, one of the LTE/LTE-A subframes may include a CCA opportunity in which the first node may perform a CCA to contend for access to the wireless communication medium.

In some examples, the medium clearing module 1350 may transmit CUBS over multiple channels of the wireless communication medium. The transmission of CUBS over multiple channels may be useful, for example, when at least a second node (e.g., a Wi-Fi node) that is proximate to the first node employs channel bonding between multiple channels.

In some examples, the medium clearing module 1350 may adjust a power of the signal it transmits based at least in part on a proximity of at least the second node to the first node to the first node. For example, the medium clearing module 1350 may adjust the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

In some examples, the first access protocol implementation module 1335 may also be used to implement an LBT protocol in combination with one or more transmissions of the signal by the medium clearing module 1350. For example, the first access protocol implementation module 1335 may implement the LBT protocol following a clearing of the wireless communication medium using the signal transmitted by the medium clearing module 1350.

In some examples, the first access protocol implementation module 1335 may continue to operate in combination with the medium clearing module 1350 until it is determined that a fair use of the wireless communication medium has been attained by the first node. In some examples, the continued operation of the medium clearing module 1350 may cause the medium clearing module 1350 to transmit a signal with a periodicity. In some examples, the periodicity may be a periodicity that causes the transmission of the signal to be repeated for adjacent LBT frames. In some examples, the periodicity may be a periodicity that causes the transmission of the signal to be repeated for non-adjacent LBT frames. In some examples, the medium clearing module 1350 may select the periodicity at which the transmission of the signal is repeated based on a number of the plurality of nodes transmitting in proximity to the first node.

Figure 14:
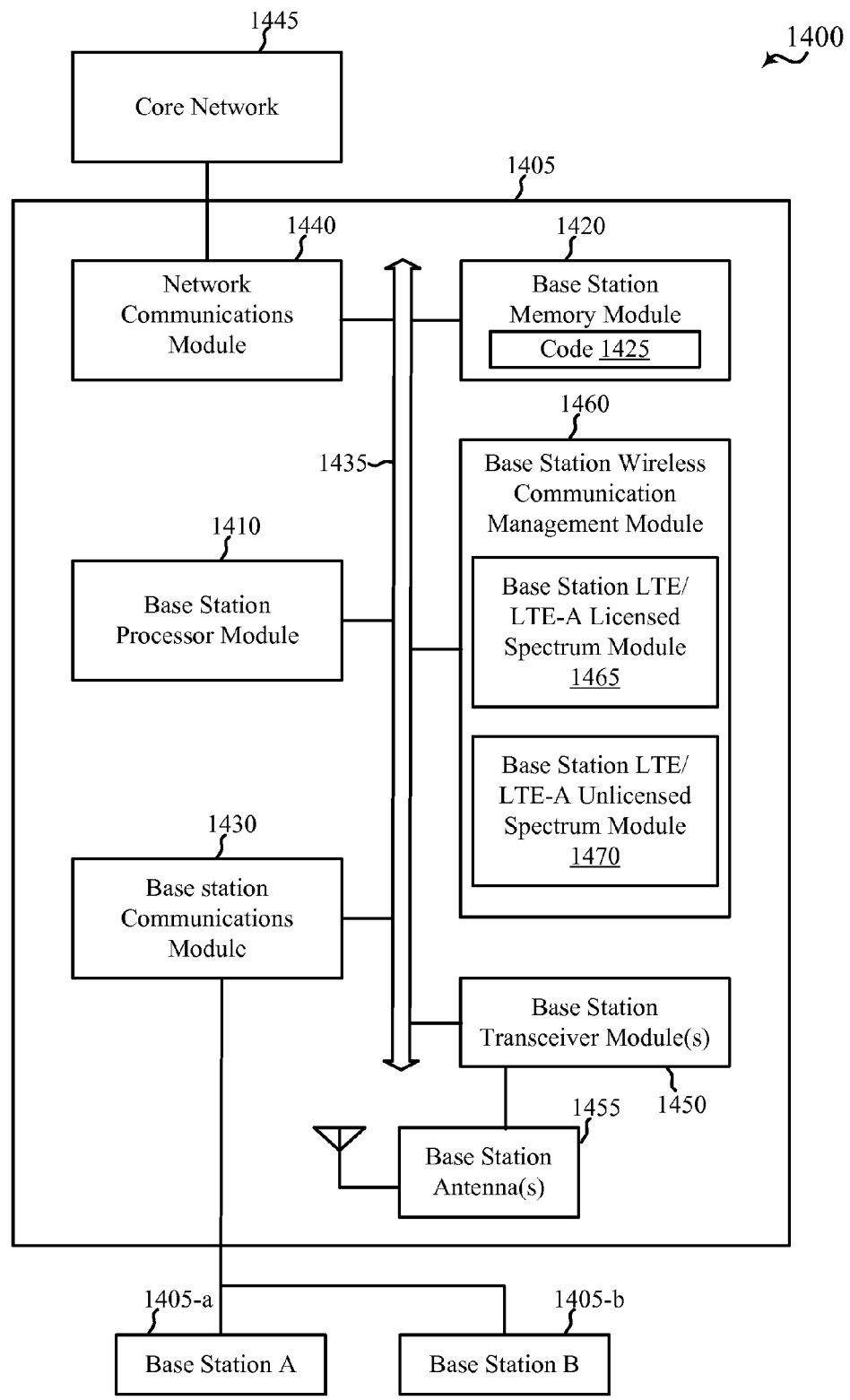
FIG. 14 shows a block diagram of a base station (e.g., a base station forming part or all of an eNB) for use in wireless communication, in accordance with various aspects of the present disclosure.

FIG. 14 shows a block diagram 1400 of a base station 1405 (e.g., a base station forming part or all of an eNB) for use in wireless communication, in accordance with various aspects of the present disclosure. In some examples, the base station 1405 may be an example of aspects of one or more of the base stations 105, 205, 205-*a*, 505, or 505-*a* described with reference to FIG. 1, 2, or 5, or aspects of one or more of the apparatuses 1005, 1105, 1205, or 1305 when configured as a base station, as described with reference to FIG. 10, 11, 12, or 13. The base station 1405 may be configured to implement or facilitate at least some of the base station or apparatus features and functions described with reference to FIG. 1, 2, 3, 4, 5, 6, 7, 8, 9, 10, 11, 12, or 13.

The base station 1405 may include a base station processor module 1410, a base station memory module 1420, at least one base station transceiver module (represented by base station transceiver module(s) 1450), at least one base station antenna (represented by base station antenna(s) 1455), or a base station wireless communication management module 1460. The base station 1405 may also include one or more of a base station communications module 1430 or a network communications module 1440. Each of these components may be in communication with each other, directly or indirectly, over one or more buses 1435.

The base station memory module 1420 may include random access memory (RAM) or read-only memory (ROM). The base station memory module 1420 may store computer-readable, computer-executable code 1425 containing instructions that are configured to, when executed, cause the base station processor module 1410 to perform various functions described herein related to wireless communication (e.g., functions relating to accessing a wireless communication medium, etc.). Alternatively, the code 1425 may not be directly executable by the base station processor module 1410 but be configured to cause the base station 1405 (e.g., when compiled and executed) to perform various of the functions described herein.

The base station processor module 1410 may include an intelligent hardware device, e.g., a central processing unit (CPU), a microcontroller, an ASIC, etc. The base station processor module 1410 may process information received through the base station transceiver module(s) 1450, the base station communications module 1430, or the network communications module 1440. The base station processor module 1410 may also process information to be sent to the transceiver module(s) 1450 for transmission through the antenna(s) 1455, to the base station communications module 1430, for transmission to one or more other base stations 1405-*a* and 1405-*b*, or to the network communications module 1440 for transmission to a core network 1445, which may be an example of one or more aspects of the core network 130 described with reference to FIG. 1. The base station processor module 1410 may handle, alone or in connection with the base station wireless communication management module 1460, various aspects of communicating over (or managing communications over) a wireless communication medium including a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a radio frequency spectrum band for which apparatuses may need to contend for access, at least in part, for unlicensed use such as Wi-Fi use or LTE/LTE-A use in an unlicensed radio frequency spectrum band).

The base station transceiver module(s) 1450 may include a modem configured to modulate data packets and provide the modulated data packets to the base station antenna(s) 1455 for transmission, and to demodulate data packets received from the base station antenna(s) 1455. The base station transceiver module(s) 1450 may, in some examples, be implemented as one or more base station transmitter modules and one or more separate base station receiver modules. The base station transceiver module(s) 1450 may support communications in the first radio frequency spectrum band or the second radio frequency spectrum band. The base station transceiver module(s) 1450 may be configured to communicate bi-directionally, via the antenna(s) 1455, with one or more UEs or apparatuses, such as one or more of the UEs 115, 215, 215-*a*, 215-*b*, 215-*c*, or 515 described with reference to FIG. 1, 2, or 5, or one or more of the apparatuses 1005, 1105, 1205, or 1305 described with reference to FIG. 10, 11, 12, or 13 when configured as a UE. The base station 1405 may, for example, include multiple base station antennas 1455 (e.g., an antenna array). The base station 1405 may communicate with the core network 1445 through the network communications module 1440. The base station 1405 may also communicate with other base stations, such as the base stations 1405-*a* and 1405-*b*, using the base station communications module 1430.

The base station wireless communication management module 1460 may be configured to perform or control some or all of the features or functions described with reference to FIG. 1, 2, 3, 4, 5, 6, 7, 8, 9, 10, 11, 12, or 13 related to wireless communication (e.g., functions relating to accessing a wireless communication medium, etc.). In some examples, the base station wireless communication management module 1460 may be configured to support a supplemental downlink mode, a carrier aggregation mode, or a standalone mode using the first radio frequency spectrum band or the second radio frequency spectrum band. The base station wireless communication management module 1460 may include a base station LTE/LTE-A licensed spectrum module 1465 configured to handle LTE/LTE-A communications in the first radio frequency spectrum band, and a base station LTE/LTE-A unlicensed spectrum module 1470 configured to handle LTE/LTE-A communications in the second radio frequency spectrum band. The base station wireless communication management module 1460, or portions of it, may include a processor, or some or all of the functions of the base station wireless communication management module 1460 may be performed by the base station processor module 1410 or in connection with the base station processor module 1410. In some examples, the base station wireless communication management module 1460 may be an example of the wireless communication management module 1020, 1120, 1220, or 1320 described with reference to FIG. 10, 11, 12, or 13.

Figure 15:
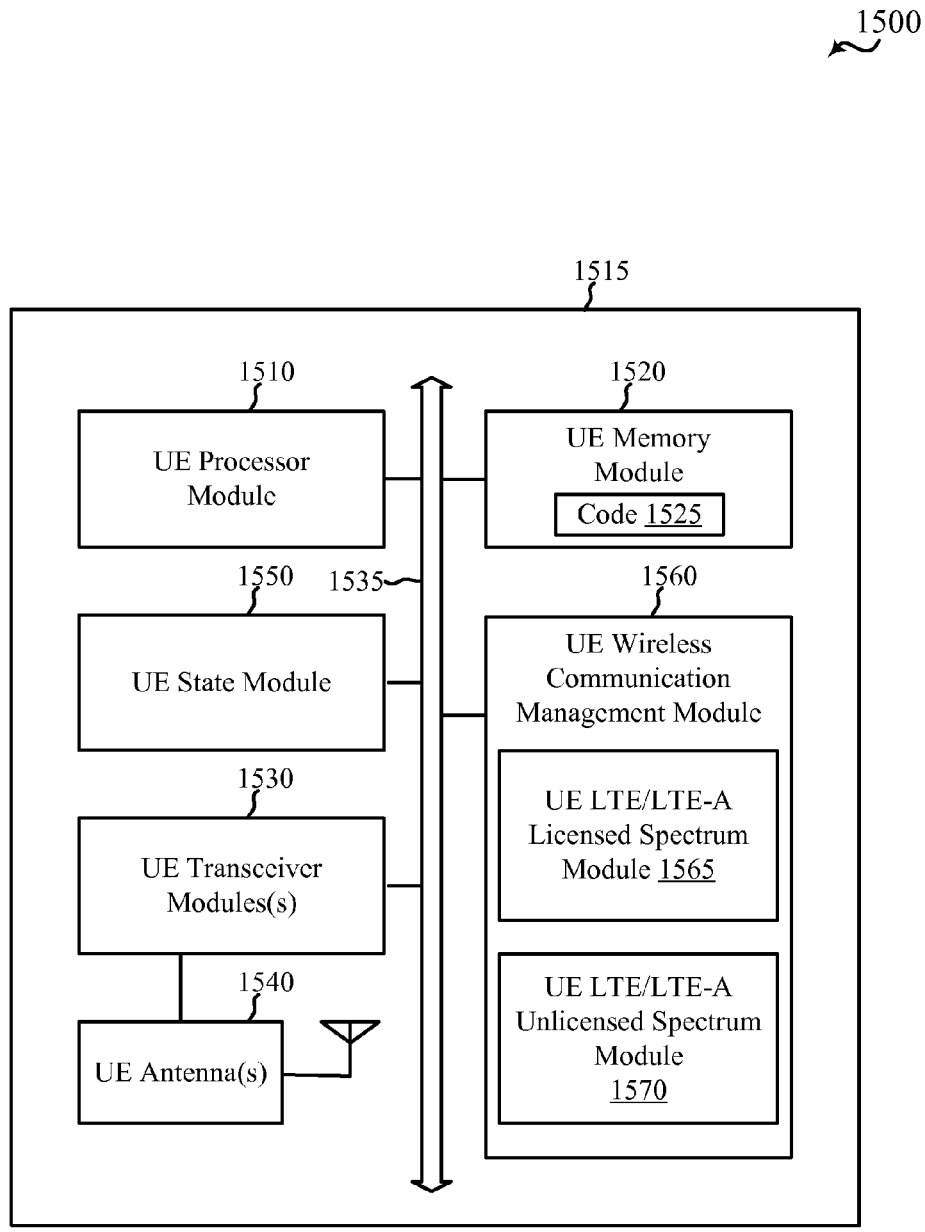
FIG. 15 shows a block diagram of a UE for use in wireless communication, in accordance with various aspects of the present disclosure.

FIG. 15 shows a block diagram 1500 of a UE 1515 for use in wireless communication, in accordance with various aspects of the present disclosure. The UE 1515 may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1515 may, in some examples, have an internal power supply (not shown), such as a small battery, to facilitate mobile operation. In some examples, the UE 1515 may be an example of aspects of one or more of the UEs 115, 215, 215-*a*, 215-*b*, 215-*c*, or 515 described with reference to FIG. 1, 2, or 5, or aspects of one or more of the apparatuses 1005, 1105, 1205, or 1305 when configured as a UE, as described with reference to FIG. 10, 11, 12, or 13. The UE 1515 may be configured to implement at least some of the UE or apparatus features and functions described with reference to FIG. 1, 2, 3, 4, 5, 6, 7, 8, 9, 10, 11, 12, or 13.

The UE 1515 may include a UE processor module 1510, a UE memory module 1520, at least one UE transceiver module (represented by UE transceiver module(s) 1530), at least one UE antenna (represented by UE antenna(s) 1540), or a UE wireless communication management module 1560. Each of these components may be in communication with each other, directly or indirectly, over one or more buses 1535.

The UE memory module 1520 may include RAM or ROM. The UE memory module 1520 may store computer-readable, computer-executable code 1525 containing instructions that are configured to, when executed, cause the UE processor module 1510 to perform various functions described herein related to wireless communication (e.g., functions relating to accessing a wireless communication medium, etc.). Alternatively, the code 1525 may not be directly executable by the UE processor module 1510 but be configured to cause the UE 1515 (e.g., when compiled and executed) to perform various of the functions described herein.

The UE processor module 1510 may include an intelligent hardware device, e.g., a CPU, a microcontroller, an ASIC, etc. The UE processor module 1510 may process information received through the UE transceiver module(s) 1530 or information to be sent to the UE transceiver module(s) 1530 for transmission through the UE antenna(s) 1540. The UE processor module 1510 may handle, alone or in connection with the UE wireless communication management module 1560, various aspects of communicating over (or managing communications over) a wireless communication medium including a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a radio frequency spectrum band for which apparatuses may need to contend for access, at least in part, for unlicensed use such as Wi-Fi use or LTE/LTE-A use in an unlicensed radio frequency spectrum band).

The UE transceiver module(s) 1530 may include a modem configured to modulate data packets and provide the modulated data packets to the UE antenna(s) 1540 for transmission, and to demodulate data packets received from the UE antenna(s) 1540. The UE transceiver module(s) 1530 may, in some examples, be implemented as one or more UE transmitter modules and one or more separate UE receiver modules. The UE transceiver module(s) 1530 may support communications in the first radio frequency spectrum band or the second radio frequency spectrum band. The UE transceiver module(s) 1530 may be configured to communicate bi-directionally, via the UE antenna(s) 1540, with one or more of the base stations 105, 205, 205-*a*, 505, 505-*a*, or 1405 described with reference to FIG. 1, 2, 5, or 14, or one or more of the apparatuses 1005, 1105, 1205, or 1305 described with reference to FIG. 10, 11, 12, or 13. While the UE 1515 may include a single UE antenna, there may be examples in which the UE 1515 may include multiple UE antennas 1540.

The UE state module 1550 may be used, for example, to manage transitions of the UE 1515 between a radio resource control (RRC) idle state and an RRC connected state, and may be in communication with other components of the UE 1515, directly or indirectly, over the one or more buses 1535. The UE state module 1550, or portions of it, may include a processor, or some or all of the functions of the UE state module 1550 may be performed by the UE processor module 1510 or in connection with the UE processor module 1510.

The UE wireless communication management module 1560 may be configured to perform or control some or all of the features or functions described with reference to FIG. 1, 2, 3, 4, 5, 6, 7, 8, 9, 10, 11, 12, or 13 related to wireless communication (e.g., functions relating to accessing a wireless communication medium, etc.). In some examples, the UE wireless communication management module 1560 may be configured to support a supplemental downlink mode, a carrier aggregation mode, or a standalone mode using the first radio frequency spectrum band or the second radio frequency spectrum band. The UE wireless communication management module 1560 may include a UE LTE/LTE-A licensed spectrum module 1565 configured to handle LTE/LTE-A communications in the first radio frequency spectrum band, and a UE LTE/LTE-A unlicensed spectrum module 1570 configured to handle LTE/LTE-A communications in the second radio frequency spectrum band. The UE wireless communication management module 1560, or portions of it, may include a processor, or some or all of the functions of the UE wireless communication management module 1560 may be performed by the UE processor module 1510 or in connection with the UE processor module 1510. In some examples, the UE wireless communication management module 1560 may be an example of the wireless communication management module 1020, 1120, 1220, or 1320 described with reference to FIG. 10, 11, 12, or 13.

Figure 16:
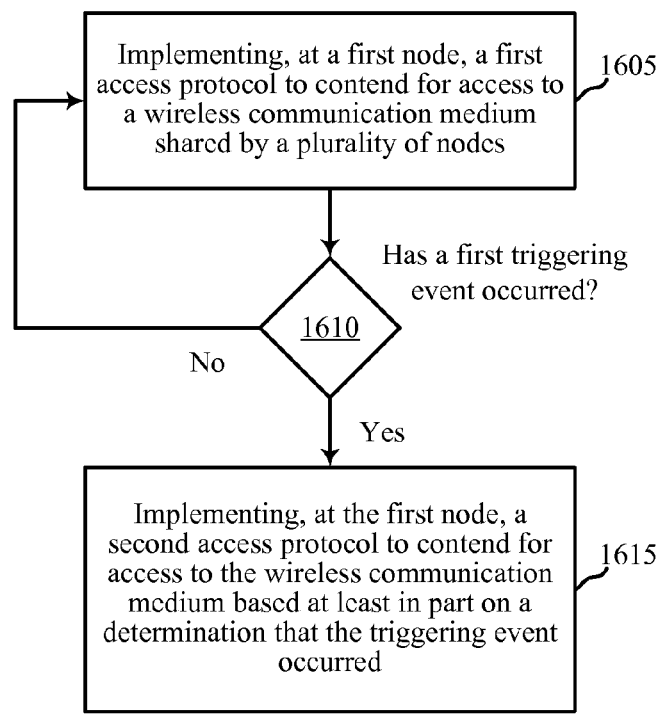
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, 205, 205-*a*, 505, 505-*a*, or 1405 described with reference to FIG. 1, 2, 5, or 14, aspects of one or more of the UEs 115, 215, 215-*a*, 215-*b*, 215-*c*, 515, or 1515 described with reference to FIG. 1, 2, 5, or 15, or aspects of one or more of the apparatuses 1005, 1105, 1205, or 1305 described with reference to FIG. 10, 11, 12, or 13. In some examples, a base station or apparatus may execute one or more sets of codes to control the functional elements of the base station or apparatus to perform the functions described below.

At block 1605, the method 1600 may include implementing, at a first node, a first access protocol to contend for access to a wireless communication medium shared by a plurality of nodes. In some examples, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band. The unlicensed radio frequency spectrum band may be a radio frequency spectrum band for which some or all of the nodes may need to contend for access, at least in part, for unlicensed use (e.g., Wi-Fi use) or LTE/LTE-A use in an unlicensed radio frequency spectrum band.

In some examples, the first node may include an LTE/LTE-A eNB or LTE/LTE-A base station. In some examples, the plurality of nodes may include one or more additional LTE/LTE-A eNBs or LTE/LTE-A base stations, or one or more Wi-Fi access points. In some examples, one or more of the additional LTE/LTE-A eNBs or LTE/LTE-A base stations of the plurality of nodes may operate asynchronously the LTE/LTE-A eNB or LTE/LTE-A base station of the first node.

The operation(s) at block 1605 may be performed using the wireless communication management module 1020, 1120, 1220, 1320, 1460, or 1560 described with reference to FIG. 10, 11, 12, 13, 14, or 15, the first access protocol implementation module 1035, 1235, or 1335 described with reference to FIG. 10, 12, or 13, or the LBT protocol implementation module 1135 described with reference to FIG. 11.

At block 1610, the method 1600 may include determining whether a triggering event has occurred. When it is determined that the triggering event has not occurred, the method 1600 may return to block 1605, where the first access protocol may continue to be implemented. When it is determined that the triggering event has occurred, and based at least in part on the determination that the triggering event has occurred, the method 1600 may proceed to block 1615. The operation(s) at block 1610 may be performed using the wireless communication management module 1020, 1120, 1220, 1320, 1460, or 1560 described with reference to FIG. 10, 11, 12, 13, 14, or 15, or the trigger monitoring module 1040, 1140, 1240, or 1340 described with reference to FIG. 10, 11, 12, or 13.

In some examples of the method 1600, the triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the method 1600 may include determining the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples of the method 1600, the triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples of the method 1600, the triggering event may include an interference with transmissions of the first node. The interference may be caused by transmissions of at least a second node of the plurality of nodes. The transmissions of the first node affected by the interference may include downlink transmissions of the first node or uplink transmissions of the first node.

At block 1615, the method 1600 may include implementing, at the first node, a second access protocol to contend for access to the wireless communication medium. The operation(s) at block 1615 may be performed using the wireless communication management module 1020, 1120, 1220, 1320, 1460, or 1560 described with reference to FIG. 10, 11, 12, 13, 14, or 15, the second access protocol implementation module 1045 described with reference to FIG. 10, the medium clearing module 1145, 1250, or 1350 described with reference to FIG. 11, 12, or 13, the CET module 1245 described with reference to FIG. 12, or the gap detection module 1345 described with reference to FIG. 13.

Thus, the method 1600 may provide for wireless communication. It should be noted that the method 1600 is just one implementation and that the operations of the method 1600 may be rearranged or otherwise modified such that other implementations are possible.

Figure 17:
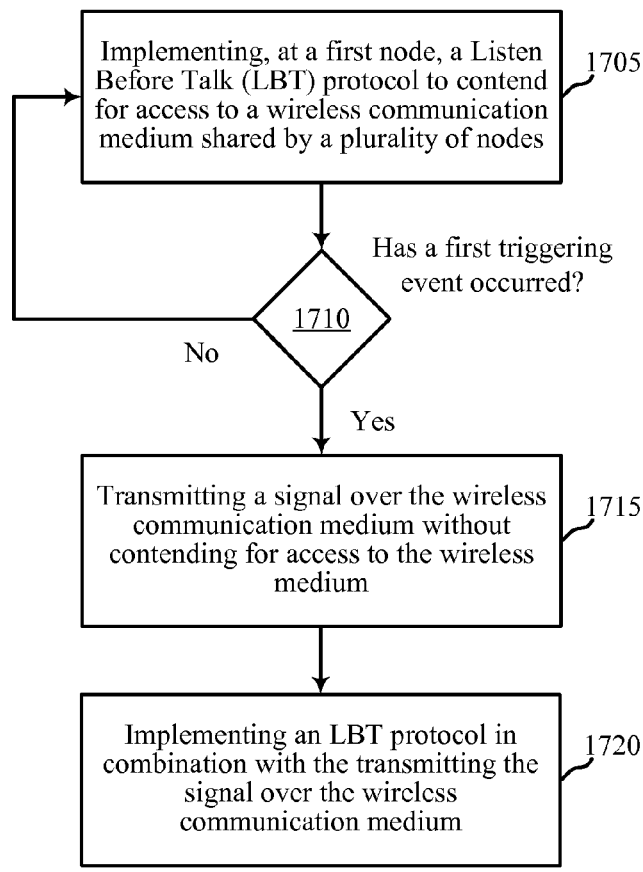
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 205-*a*, 505, 505-*a*, or 1405 described with reference to FIG. 1, 2, 5, or 14, aspects of one or more of the UEs 115, 215, 215-*a*, 215-*b*, 215-*c*, 515, or 1515 described with reference to FIG. 1, 2, 5, or 15, or aspects of one or more of the apparatuses 1005 or 1105 described with reference to FIG. 10 or 11. In some examples, a base station or apparatus may execute one or more sets of codes to control the functional elements of the base station or apparatus to perform the functions described below.

At block 1705, the method 1700 may include implementing, at a first node, a first access protocol to contend for access to a wireless communication medium shared by a plurality of nodes. In some examples, and as shown, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band. The unlicensed radio frequency spectrum band may be a radio frequency spectrum band for which some or all of the nodes may need to contend for access, at least in part, for unlicensed use (e.g., Wi-Fi use) or LTE/LTE-A use in an unlicensed radio frequency spectrum band.

In some examples, the first node may include an LTE/LTE-A eNB or LTE/LTE-A base station. In some examples, the plurality of nodes may include one or more additional LTE/LTE-A eNBs or LTE/LTE-A base stations, or one or more Wi-Fi access points. In some examples, one or more of the additional LTE/LTE-A eNBs or LTE/LTE-A base stations of the plurality of nodes may operate asynchronously the LTE/LTE-A eNB or LTE/LTE-A base station of the first node.

The operation(s) at block 1705 may be performed using the wireless communication management module 1020, 1120, 1460, or 1560 described with reference to FIG. 10, 11, 14, or 15, the first access protocol implementation module 1035 described with reference to FIG. 10, or the LBT protocol implementation module 1135 described with reference to FIG. 11.

At block 1710, the method 1700 may include determining whether a first triggering event has occurred. When it is determined that the first triggering event has not occurred, the method 1700 may return to block 1705, where the first access protocol may continue to be implemented. When it is determined that the first triggering event has occurred, the method 1700 may proceed to block 1715. The operation(s) at block 1710 may be performed using the wireless communication management module 1020, 1120, 1460, or 1560 described with reference to FIG. 10, 11, 14, or 15, or the trigger monitoring module 1040 or 1140 described with reference to FIG. 10 or 11.

In some examples of the method 1700, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the method 1700 may include determining the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples of the method 1700, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples of the method 1700, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

At blocks 1715 and 1720, the method 1700 may include implementing, at the first node, a second access protocol to contend for access to the wireless communication medium. At block 1715, the method 1700 may include transmitting a signal over the wireless communication medium without contending for access to the wireless communication medium. The signal may be a signal that, when detected by at least a second node of the plurality of nodes, causes at least the second node to discontinue transmissions over, refrain from transmitting over, or fail contention for access to, the wireless communication medium.

In some examples of the method 1700, transmitting the signal at block 1715 may include transmitting at least one CTS-to-self signal. In these examples, at least one NAV of the at least one CTS-to-self signal may specify a reservation time period of the wireless communication medium extending until a next LBT frame. When multiple CTS-to-self signals are transmitted, a subsequent CTS-to-self signal may be transmitted immediately following a previous CTS-to-self signal or before the expiration of an NAV of a previous CTS-to-self signal.

In other examples in which at least one CTS-to-self signal is transmitted at block 1715, at least one NAV of the at least one CTS-to-self signal may specify a reservation time period of the wireless communication medium extending across a plurality of LBT frames.

In some examples of the method 1700, transmitting the signal at block 1715 may include transmitting at least one Wi-Fi beacon signal.

In some examples of the method 1700, transmitting the signal at block 1715 may include transmitting signals over multiple channels of the wireless communication medium. The transmission of signals over multiple channels may be useful, for example, when at least a second node (e.g., a Wi-Fi node) that is proximate to the first node employs channel bonding between multiple channels.

In some examples, the method 1700 may further include adjusting a power of the signal transmitted at block 1715, based at least in part on a proximity of at least the second node to the first node. Adjusting the power of the signal may include adjusting the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

The operation(s) at block 1715 may be performed using the wireless communication management module 1020, 1120, 1460, or 1560 described with reference to FIG. 10, 11, 14, or 15, the second access protocol implementation module 1045 described with reference to FIG. 10, or the medium clearing module 1145 described with reference to FIG. 11.

At block 1720, the method 1700 may include implementing an LBT protocol in combination with transmission of the signal at block 1715. For example, the LBT protocol may be implemented following a clearing of the wireless communication medium using the signal transmitted at block 1715. In some examples, the LBT protocol may be a frame-based LBT protocol; and in some examples, the LBT protocol may be the same LBT protocol implemented at block 1705. The operation(s) at block 1720 may be performed using the wireless communication management module 1020, 1120, 1460, or 1560 described with reference to FIG. 10, 11, 14, or 15, the first access protocol implementation module 1035 described with reference to FIG. 10, or the LBT protocol implementation module 1135 described with reference to FIG. 11.

In some examples, the operation(s) at block 1715 or 1720 may be repeated until it is determined that a fair use of the wireless communication medium has been attained by the first node. The repetitions of the operation(s) at blocks 1715 or 1720 may cause the transmission of the signal at blocks 1715 to be repeated with a periodicity. In some examples, the periodicity may be a periodicity that causes the transmissions of the signal at block 1715 to be repeated for adjacent LBT frames. In some examples, the periodicity may be a periodicity that causes the transmission of the signal at block 1715 to be repeated for non-adjacent LBT frames. In some examples, the method 1700 may include selecting the periodicity at which the transmission of the signal at block 1715 is repeated based on a number of the plurality of nodes transmitting in proximity to the first node.

Thus, the method 1700 may provide for wireless communication. It should be noted that the method 1700 is just one implementation and that the operations of the method 1700 may be rearranged or otherwise modified such that other implementations are possible.

Figure 18:
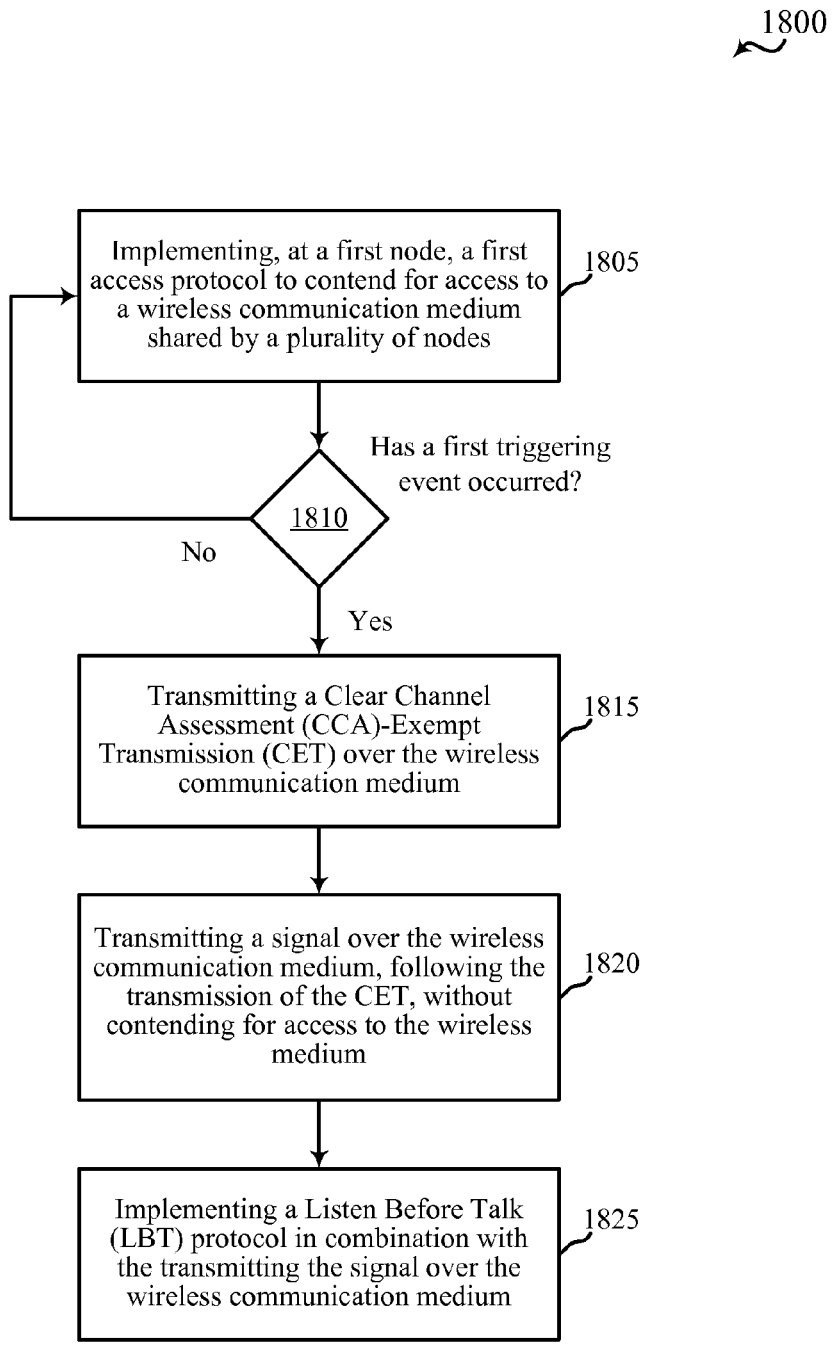
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 205, 205-*a*, 505, 505-*a*, or 1405 described with reference to FIG. 1, 2, 5, or 14, aspects of one or more of the UEs 115, 215, 215-*a*, 215-*b*, 215-*c*, 515, or 1515 described with reference to FIG. 1, 2, 5, or 15, or aspects of one or more of the apparatuses 1005 or 1205 described with reference to FIG. 10 or 12. In some examples, a base station or apparatus may execute one or more sets of codes to control the functional elements of the base station or apparatus to perform the functions described below.

At block 1805, the method 1800 may include implementing, at a first node, a first access protocol to contend for access to a wireless communication medium shared by a plurality of nodes. In some examples, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band. The unlicensed radio frequency spectrum band may be a radio frequency spectrum band for which some or all of the nodes may need to contend for access, at least in part, for unlicensed use (e.g., Wi-Fi use) or LTE/LTE-A use in an unlicensed radio frequency spectrum band.

In some examples, the first node may include an LTE/LTE-A eNB or LTE/LTE-A base station. In some examples, the plurality of nodes may include one or more additional LTE/LTE-A eNBs or LTE/LTE-A base stations, or one or more Wi-Fi access points. In some examples, one or more of the additional LTE/LTE-A eNBs or LTE/LTE-A base stations of the plurality of nodes may operate asynchronously the LTE/LTE-A eNB or LTE/LTE-A base station of the first node.

The operation(s) at block 1805 may be performed using the wireless communication management module 1020, 1220, 1460, or 1560 described with reference to FIG. 10, 12, 14, or 15, or the first access protocol implementation module 1035 or 1235 described with reference to FIG. 10 or 12.

At block 1810, the method 1800 may include determining whether a first triggering event has occurred. When it is determined that the first triggering event has not occurred, the method 1800 may return to block 1805, where the first access protocol may continue to be implemented. When it is determined that the first triggering event has occurred, the method 1800 may proceed to block 1815. The operation(s) at block 1810 may be performed using the wireless communication management module 1020, 1220, 1460, or 1560 described with reference to FIG. 10, 12, 14, or 15, or the trigger monitoring module 1040 or 1240 described with reference to FIG. 10 or 12.

In some examples of the method 1800, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the method 1800 may include determining the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples of the method 1800, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples of the method 1800, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

At blocks 1815, 1820, and 1825, the method 1800 may include implementing, at the first node, a second access protocol to contend for access to the wireless communication medium. At block 1815, the method 1800 may include the first node transmitting a CET over the wireless communication medium. In some examples, the CET may be transmitted for reasons other than implementation of the second access protocol. For example, the CET may be transmitted to facilitate node discovery, to transmit control or management signals, or for other purposes. The operation(s) at block 1815 may be performed using the wireless communication management module 1020, 1220, 1460, or 1560 described with reference to FIG. 10, 12, 14, or 15, the second access protocol implementation module 1045 described with reference to FIG. 10, or the CET module 1245 described with reference to FIG. 12.

At block 1820, the method 1800 may include transmitting a signal over the wireless communication medium without contending for access to the wireless communication medium. The signal may be transmitted over the wireless communication medium following the transmission of the CET at block 1815. The signal may be a signal that, when detected by at least a second node of the plurality of nodes, causes at least the second node to discontinue transmissions over, refrain from transmitting over, or fail contention for access to, the wireless communication medium.

In some examples of the method 1800, transmitting the signal at block 1820 may include transmitting at least one CTS-to-self signal. In these examples, at least one NAV of the at least one CTS-to-self signal may specify a reservation time period of the wireless communication medium extending until a next LBT frame. When multiple CTS-to-self signals are transmitted, a subsequent CTS-to-self signal may be transmitted immediately following a previous CTS-to-self signal or before the expiration of an NAV of a previous CTS-to-self signal.

In other examples in which at least one CTS-to-self signal is transmitted at block 1820, at least one NAV of the at least one CTS-to-self signal may specify a reservation time period of the wireless communication medium extending across a plurality of LBT frames.

In some examples of the method 1800, transmitting the signal at block 1820 may include transmitting at least one Wi-Fi beacon signal.

In some examples of the method 1800, transmitting the signal at block 1820 may include transmitting signals over multiple channels of the wireless communication medium. The transmission of signals over multiple channels may be useful, for example, when at least a second node (e.g., a Wi-Fi node) that is proximate to the first node employs channel bonding between multiple channels.

In some examples, the method 1800 may further include adjusting a power of the signal transmitted at block 1820, based at least in part on a proximity of at least the second node to the first node. Adjusting the power of the signal may include adjusting the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

The operation(s) at block 1820 may be performed using the wireless communication management module 1020, 1220, 1460, or 1560 described with reference to FIG. 10, 12, 14, or 15, the second access protocol implementation module 1045 described with reference to FIG. 10, or the medium clearing module 1250 described with reference to FIG. 12.

At block 1825, the method 1800 may include implementing an LBT protocol in combination with transmission of the signal at block 1820. For example, the LBT protocol may be implemented following a clearing of the wireless communication medium using the signal transmitted at block 1820. In some examples, the LBT protocol may be a frame-based LBT protocol; and in some examples, the LBT protocol may be the same LBT protocol implemented at block 1805. The operation(s) at block 1825 may be performed using the wireless communication management module 1020, 1220, 1460, or 1560 described with reference to FIG. 10, 12, 14, or 15, the first access protocol implementation module 1035 described with reference to FIG. 10, or the first access protocol implementation module 1235 described with reference to FIG. 12.

In some examples, the operation(s) at block 1815, 1820, or 1825 may be repeated until it is determined that a fair use of the wireless communication medium has been attained by the first node. The repetitions of the operation(s) at blocks 1815, 1820, or 1825 may cause the transmission of the signal at blocks 1820 to be repeated with a periodicity. In some examples, the periodicity may be a periodicity that causes the transmissions of the signal at block 1820 to be repeated for adjacent LBT frames. In some examples, the periodicity may be a periodicity that causes the transmission of the signal at block 1820 to be repeated for non-adjacent LBT frames. In some examples, the method 1800 may include selecting the periodicity at which the transmission of the signal at block 1820 is repeated based on a number of the plurality of nodes transmitting in proximity to the first node.

Thus, the method 1800 may provide for wireless communication. It should be noted that the method 1800 is just one implementation and that the operations of the method 1800 may be rearranged or otherwise modified such that other implementations are possible.

Figure 19:
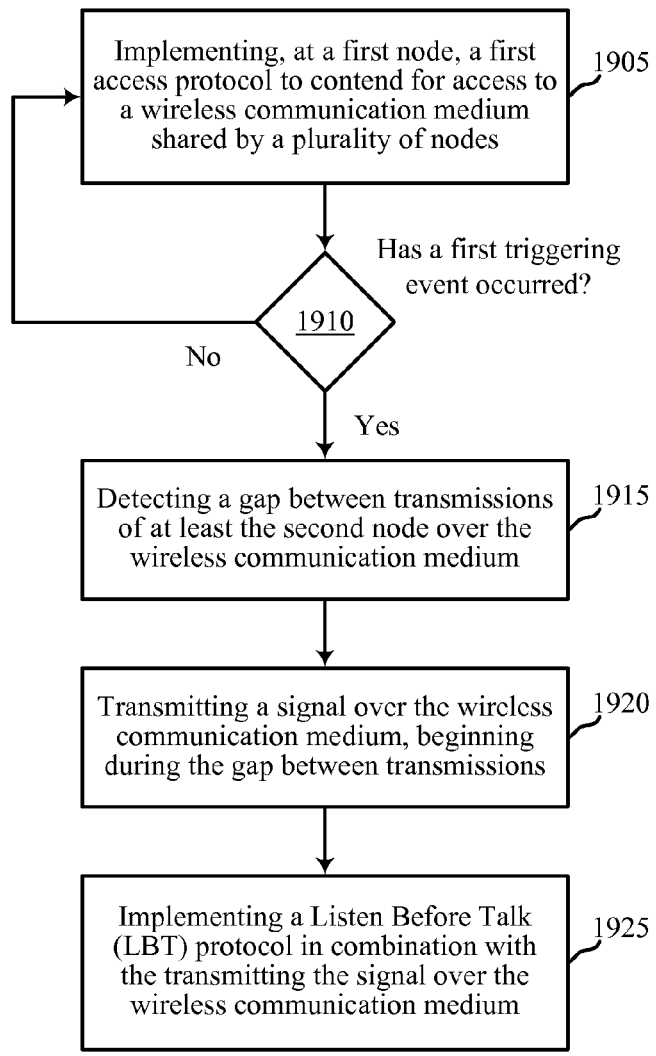
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the base stations 105, 205, 205-*a*, 505, 505-*a*, or 1405 described with reference to FIG. 1, 2, 5, or 14, aspects of one or more of the UEs 115, 215, 215-*a*, 215-*b*, 215-*c*, 515, or 1515 described with reference to FIG. 1, 2, 5, or 15, or aspects of one or more of the apparatuses 1005 or 1305 described with reference to FIG. 10 or 13. In some examples, a base station or apparatus may execute one or more sets of codes to control the functional elements of the base station or apparatus to perform the functions described below.

At block 1905, the method 1900 may include implementing, at a first node, a first access protocol to contend for access to a wireless communication medium shared by a plurality of nodes. In some examples, implementing the first access protocol may include implementing an LBT protocol.

In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band. The unlicensed radio frequency spectrum band may be a radio frequency spectrum band for which some or all of the nodes may need to contend for access, at least in part, for unlicensed use (e.g., Wi-Fi use) or LTE/LTE-A use in an unlicensed radio frequency spectrum band.

In some examples, the first node may include an LTE/LTE-A eNB or LTE/LTE-A base station. In some examples, the plurality of nodes may include one or more additional LTE/LTE-A eNBs or LTE/LTE-A base stations, or one or more Wi-Fi access points. In some examples, one or more of the additional LTE/LTE-A eNBs or LTE/LTE-A base stations of the plurality of nodes may operate asynchronously the LTE/LTE-A eNB or LTE/LTE-A base station of the first node.

The operation(s) at block 1905 may be performed using the wireless communication management module 1020, 1320, 1460, or 1560 described with reference to FIG. 10, 13, 14, or 15, or the first access protocol implementation module 1035 or 1335 described with reference to FIG. 10 or 13.

At block 1910, the method 1900 may include determining whether a first triggering event has occurred. When it is determined that the first triggering event has not occurred, the method 1900 may return to block 1905, where the first access protocol may continue to be implemented. When it is determined that the first triggering event has occurred, the method 1900 may proceed to block 1915. The operation(s) at block 1910 may be performed using the wireless communication management module 1020, 1320, 1460, or 1560 described with reference to FIG. 10, 13, 14, or 15, or the trigger monitoring module 1040 or 1340 described with reference to FIG. 10 or 13.

In some examples of the method 1900, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the method 1900 may include determining the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples of the method 1900, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples of the method 1900, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

At blocks 1915, 1920, and 1925, the method 1900 may include implementing, at the first node, a second access protocol to contend for access to the wireless communication medium. At block 1915, the method 1900 may include detecting a gap between transmissions of at least the second node over the wireless communication medium. In some examples, the gap may have a duration shorter than a DIFS duration, a PIFS duration, or an EIFS duration. In some examples, the gap may have a duration equal to or approximately equal to a SIFS duration, or have a duration between a SIFS duration and a DIFS duration. The operation(s) at block 1915 may be performed using the wireless communication management module 1020, 1320, 1460, or 1560 described with reference to FIG. 10, 13, 14, or 15, the second access protocol implementation module 1045 described with reference to FIG. 10, or the gap detection module 1345 described with reference to FIG. 13.

At block 1920, the method 1900 may include transmitting a signal over the wireless communication medium without contending for access to the wireless communication medium. The transmission of the signal over the wireless communication medium may begin during the detected gap between the transmissions. The signal may be a signal that, when detected by at least a second node of the plurality of nodes, causes at least the second node to discontinue transmissions over, refrain from transmitting over, or fail contention for access to, the wireless communication medium.

In some examples of the method 1900, transmitting the signal at block 1920 may include transmitting at least one CTS-to-self signal. In these examples, at least one NAV of the at least one CTS-to-self signal may specify a reservation time period of the wireless communication medium extending until a next LBT frame. When multiple CTS-to-self signals are transmitted, a subsequent CTS-to-self signal may be transmitted immediately following a previous CTS-to-self signal or before the expiration of an NAV of a previous CTS-to-self signal.

In other examples in which at least one CTS-to-self signal is transmitted at block 1920, at least one NAV of the at least one CTS-to-self signal may specify a reservation time period of the wireless communication medium extending across a plurality of LBT frames.

In some examples of the method 1900, transmitting the signal at block 1920 may include transmitting at least one CUBS.

In some examples of the method 1900, transmitting the signal at block 1920 may include transmitting at least one Wi-Fi beacon signal.

In some examples of the method 1900, transmitting the signal at block 1920 may include transmitting signals over multiple channels of the wireless communication medium. The transmission of signals over multiple channels may be useful, for example, when at least a second node (e.g., a Wi-Fi node) that is proximate to the first node employs channel bonding between multiple channels.

In some examples, the method 1900 may further include adjusting a power of the signal transmitted at block 1920, based at least in part on a proximity of at least the second node to the first node. Adjusting the power of the signal may include adjusting the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

The operation(s) at block 1920 may be performed using the wireless communication management module 1020, 1320, 1460, or 1560 described with reference to FIG. 10, 13, 14, or 15, the second access protocol implementation module 1045 described with reference to FIG. 10, or the medium clearing module 1350 described with reference to FIG. 13.

At block 1925, the method 1900 may include implementing an LBT protocol in combination with transmission of the signal at block 1920. For example, the LBT protocol may be implemented following a clearing of the wireless communication medium using the signal transmitted at block 1920. In some examples, the LBT protocol may be a frame-based LBT protocol; and in some examples, the LBT protocol may be the same LBT protocol implemented at block 1905. The operation(s) at block 1925 may be performed using the wireless communication management module 1020, 1320, 1460, or 1560 described with reference to FIG. 10, 13, 14, or 15, the first access protocol implementation module 1035 described with reference to FIG. 10, or the first access protocol implementation module 1335 described with reference to FIG. 13.

In some examples, the operation(s) at block 1915, 1920, or 1925 may be repeated until it is determined that a fair use of the wireless communication medium has been attained by the first node. The repetitions of the operation(s) at blocks 1915, 1920, or 1925 may cause the transmission of the signal at blocks 1920 to be repeated with a periodicity. In some examples, the periodicity may be a periodicity that causes the transmissions of the signal at block 1920 to be repeated for adjacent LBT frames. In some examples, the periodicity may be a periodicity that causes the transmission of the signal at block 1920 to be repeated for non-adjacent LBT frames. In some examples, the method 1900 may include selecting the periodicity at which the transmission of the signal at block 1920 is repeated based on a number of the plurality of nodes transmitting in proximity to the first node.

Thus, the method 1900 may provide for wireless communication. It should be noted that the method 1900 is just one implementation and that the operations of the method 1900 may be rearranged or otherwise modified such that other implementations are possible.

Figure 20:
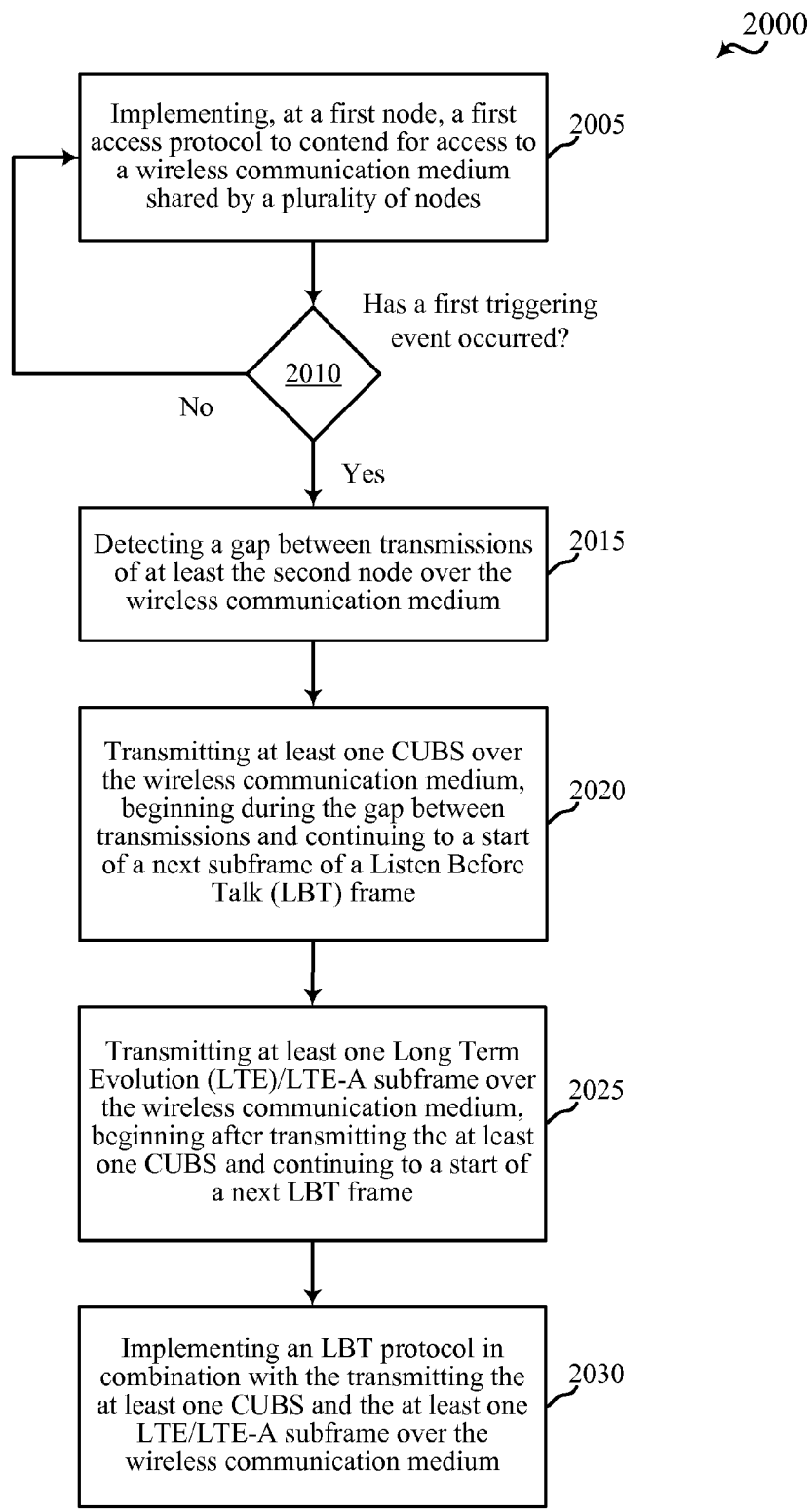
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the base stations 105, 205, 205-a, 505, 505-a, or 1405 described with reference to FIG. 1, 2, 5, or 14, aspects of one or more of the UEs 115, 215, 215-a, 215-b, 215-c, 515, or 1515 described with reference to FIG. 1, 2, 5, or 15, or aspects of one or more of the apparatuses 1005 or 1305 described with reference to FIG. 10 or 13. In some examples, a base station or apparatus may execute one or more sets of codes to control the functional elements of the base station or apparatus to perform the functions described below.

At block 2005, the method 2000 may include implementing, at a first node, a first access protocol to contend for access to a wireless communication medium shared by a plurality of nodes. In some examples, implementing the first access protocol may include implementing an LBT protocol. In some examples, implementing the first access protocol may include implementing a frame-based access protocol, such as a frame-based LBT protocol. In some examples, the wireless communication medium may include a radio frequency spectrum band shared by the plurality of nodes, and different nodes within the plurality of nodes may implement different protocols to contend for access to the radio frequency spectrum band. In some examples, the radio frequency spectrum band may include an unlicensed radio frequency spectrum band. The unlicensed radio frequency spectrum band may be a radio frequency spectrum band for which some or all of the nodes may need to contend for access, at least in part, for unlicensed use (e.g., Wi-Fi use) or LTE/LTE-A use in an unlicensed radio frequency spectrum band.

In some examples, the first node may include an LTE/LTE-A eNB or LTE/LTE-A base station. In some examples, the plurality of nodes may include one or more additional LTE/LTE-A eNBs or LTE/LTE-A base stations, or one or more Wi-Fi access points. In some examples, one or more of the additional LTE/LTE-A eNBs or LTE/LTE-A base stations of the plurality of nodes may operate asynchronously the LTE/LTE-A eNB or LTE/LTE-A base station of the first node.

The operation(s) at block 2005 may be performed using the wireless communication management module 1020, 1320, 1460, or 1560 described with reference to FIG. 10, 13, 14, or 15, or the first access protocol implementation module 1035 or 1335 described with reference to FIG. 10 or 13.

At block 2010, the method 2000 may include determining whether a first triggering event has occurred. When it is determined that the first triggering event has not occurred, the method 2000 may return to block 2005, where the first access protocol may continue to be implemented. When it is determined that the first triggering event has occurred, the method 2000 may proceed to block 2015. The operation(s) at block 2010 may be performed using the wireless communication management module 1020, 1320, 1460, or 1560 described with reference to FIG. 10, 13, 14, or 15, or the trigger monitoring module 1040 or 1340 described with reference to FIG. 10 or 13.

In some examples of the method 2000, the first triggering event may include a use ratio of the wireless communication medium satisfying a threshold. In some examples, the use ratio of the wireless communication medium may be based at least in part on a use of the wireless communication medium by the first node and a use of the wireless communication medium by at least a second node of the plurality of nodes (e.g., a ratio of the use of the wireless communication medium by the first node and the use of the wireless communication medium by at least a second node of the plurality of nodes). In some examples, the method 2000 may include determining the use of the wireless communication medium by at least the second node by, for example, decoding preambles of data packets transmitted by at least the second node to determine a duration of each of the data packets transmitted by at least the second node. The threshold to which the use ratio of the wireless communication medium is compared may be configured, in some examples, to ensure fair use of the wireless communication medium by the first node relative to use of the wireless communication medium by some or all of the other nodes in the plurality of nodes.

In some examples of the method 2000, the first triggering event may include a use of the wireless communication medium satisfying a threshold. In some examples, the use of the wireless communication medium may be based at least in part on a use of the wireless communication medium by at least a second node of the plurality of nodes. In some examples, the use of the wireless communication medium by at least the second node may be a discontinuous use of the wireless communication medium.

In some examples of the method 2000, the first triggering event may include an interference with transmissions of the first node. The interference may be caused by transmissions of at least a second node of the plurality of nodes. The transmissions of the first node affected by the interference may include downlink transmissions of the first node or uplink transmissions of the first node.

At blocks 2015, 2020, 2025, and 2030, the method 2000 may include implementing, at the first node, a second access protocol to contend for access to the wireless communication medium. At block 2015, the method 2000 may include detecting a gap between transmissions of at least the second node over the wireless communication medium. The operation(s) at block 2015 may be performed using the wireless communication management module 1020, 1320, 1460, or 1560 described with reference to FIG. 10, 13, 14, or 15, the second access protocol implementation module 1045 described with reference to FIG. 10, or the gap detection module 1345 described with reference to FIG. 13.

At block 2020, the method 2000 may include transmitting at least one CUBS over the wireless communication medium without contending for access to the wireless communication medium. The transmission of the at least one CUBS may begin during the gap and continue until a start of a next subframe of an LBT frame. When detected by at least the second node of the plurality of nodes, the CUBS may cause at least the second node to discontinue transmissions over, refrain from transmitting over, or fail contention for access to, the wireless communication medium.

In some examples of the method 2000, transmitting the at least one CUBS at block 2020 may include transmitting signals over multiple channels of the wireless communication medium. The transmission of CUBS over multiple channels may be useful, for example, when at least a second node (e.g., a Wi-Fi node) that is proximate to the first node employs channel bonding between multiple channels.

At block 2025, the method 2000 may include transmitting at least one LTE/LTE-A subframe. The transmission of the at least one LTE/LTE-A subframe may begin after transmitting the at least one CUBS and continue until a start of a next LBT frame. When detected by at least the second node of the plurality of nodes, the at least one LTE/LTE-A subframe may cause at least the second node to discontinue transmissions over, refrain from transmitting over, or fail contention for access to, the wireless communication medium. In some examples, one of the LTE/LTE-A subframes may include a CCA opportunity in which the first node may perform a CCA to contend for access to the wireless communication medium.

In some examples, the method 2000 may further include adjusting a power of the signal transmitted at block 2020, based at least in part on a proximity of at least the second node to the first node. Adjusting the power of the signal may include adjusting the power of the signal such that the signal has sufficient power to be detected by at least a second node that is preventing the first node from using the wireless communication medium, but not so great a power that the signal unnecessarily prevents other nodes from using the wireless communication medium. In some examples, a power of at least the second node, received at the first node, may be used to determine a path loss and compensate only for the determined path loss and possibly an additional link budget.

The operation(s) at block 2020 or 2025 may be performed using the wireless communication management module 1020, 1320, 1460, or 1560 described with reference to FIG. 10, 13, 14, or 15, the second access protocol implementation module 1045 described with reference to FIG. 10, or the medium clearing module 1350 described with reference to FIG. 13.

At block 2030, the method 2000 may include implementing an LBT protocol in combination with transmission of the at least one CUBS and the at least one LTE/LTE-A subframe at blocks 2020 and 2025. For example, the LBT protocol may be implemented following a clearing of the wireless communication medium using the at least one CUBS and at least one LTE/LTE-A subframe transmitted at blocks 2020 and 2025. In some examples, the LBT protocol may be a frame-based LBT protocol; and in some examples, the LBT protocol may be the same LBT protocol implemented at block 2005. The operation(s) at block 2030 may be performed using the wireless communication management module 1020, 1320, 1460, or 1560 described with reference to FIG. 10, 13, 14, or 15, the first access protocol implementation module 1035 described with reference to FIG. 10, or the first access protocol implementation module 1335 described with reference to FIG. 13.

In some examples, the operation(s) at blocks 2015, 2020, 2025, or 2030 may be repeated until it is determined that a fair use of the wireless communication medium has been attained by the first node. The repetitions of the operation(s) at blocks 2015, 2020, 2025, or 2030 may cause the transmissions at blocks 2020 and 2025 to be repeated with a periodicity. In some examples, the periodicity may be a periodicity that causes the transmissions at blocks 2020 and 2025 to be repeated for adjacent LBT frames. In some examples, the periodicity may be a periodicity that causes the transmissions at blocks 2020 and 2025 to be repeated for non-adjacent LBT frames. In some examples, the method 2000 may include selecting the periodicity at which the transmissions at blocks 2020 and 2025 are repeated based on a number of the plurality of nodes transmitting in proximity to the first node.

Thus, the method 2000 may provide for wireless communication. It should be noted that the method 2000 is just one implementation and that the operations of the method 2000 may be rearranged or otherwise modified such that other implementations are possible.

In some examples, aspects from two or more of the methods 1600, 1700, 1800, 1900, or 2000 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
    implementing, at a first node, a first access protocol to contend for access to a wireless communication medium shared by a plurality of nodes, wherein the first access protocol comprises a frame-based Listen Before Talk (LBT) access protocol;
    determining whether a first triggering event has occurred;
    implementing, at the first node, a second access protocol to contend for access to the wireless communication medium based at least in part on a determination that the first triggering event has occurred, wherein the second access protocol comprises an LBT access protocol; and
    transmitting, from the first node, a signal over the wireless communication medium without contending for access to the wireless communication medium in combination with implementing the second access protocol.

2. The method of claim 1, wherein the first triggering event comprises at least one of a use of the wireless communication medium satisfying a threshold, or a use ratio of the wireless communication medium satisfying a threshold, or a combination thereof.

3. The method of claim 2, wherein the use ratio of the wireless communication medium is based at least in part on a use of the wireless communication medium by the first node and a use of the wireless communication medium by at least a second node of the plurality of nodes.

4. The method of claim 3, further comprising:
    determining the use of the wireless communication medium by at least the second node, wherein the determining the use of the wireless communication medium by at least the second node comprises decoding preambles of data packets transmitted by at least the second node to determine a duration of each of the data packets transmitted by at least the second node.

5. The method of claim 2, wherein the use of the wireless communication medium is based at least in part on a use of the wireless communication medium by at least a second node of the plurality of nodes.

6. The method of claim 2, wherein the use of the wireless communication medium is based at least in part on a discontinuous use of the wireless communication medium by at least a second node of the plurality of nodes.

7. The method of claim 1, wherein the first triggering event comprises an interference with transmissions of the first node by transmissions of at least a second node of the plurality of nodes.

8. The method of claim 1, wherein the transmitting the signal comprises transmitting at least one Clear To Send to self (CTS-to-self) signal.

9. The method of claim 8, wherein at least one Network Allocation Vector (NAV) of the at least one CTS-to-self signal specifies a reservation time period of the wireless communication medium extending until at least one subsequent LBT frame.

10. The method of claim 1, wherein the transmitting the signal comprises transmitting at least one Wi-Fi beacon signal.

11. The method of claim 1, wherein the signal is transmitted over the wireless communication medium following a transmission of a Clear Channel Assessment (CCA)-Exempt Transmission (CET) over the wireless communication medium by the first node.

12. The method of claim 1, wherein the implementing the second access protocol to contend for access to the wireless communication medium comprises:
detecting a gap between transmissions of at least a second node over the wireless communication medium; and
beginning the transmitting the signal over the wireless communication medium during the gap between the transmissions.

13. The method of claim 12, wherein the gap has a duration shorter than a Distributed Coordination Function (DCF) Interframe Space (DIFS) duration or a duration equal to or approximately equal to a Short Interframe Space (SIFS) duration.

14. The method of claim 1, wherein the implementing the second access protocol to contend for access to the wireless communication medium comprises:
detecting a gap between transmissions of at least a second node over the wireless communication medium;
transmitting at least one Channel Usage Beacon Signal (CUBS) over the wireless communication medium, beginning during the gap and continuing to a start of a next subframe of an LBT frame; and
transmitting at least one Long Term Evolution (LTE)/LTE-A subframe over the wireless communication medium, beginning after transmitting the at least one CUBS and continuing to a start of a next LBT frame.

15. The method of claim 1, further comprising:
repeating the transmission of the signal with a periodicity, wherein the periodicity is based at least in part on a number of the plurality of nodes transmitting in proximity to the first node.

16. The method of claim 1, further comprising:
adjusting a power of the signal based at least in part on a proximity of at least a second node to the first node.

17. The method of claim 1, wherein the wireless communication medium comprises a radio frequency spectrum band shared by the plurality of nodes, and wherein different nodes implement different protocols to contend for access to the radio frequency spectrum band.

18. The method of claim 17, wherein the radio frequency spectrum band comprises an unlicensed radio frequency spectrum band.

19. The method of claim 17, wherein the first node comprises a Long Term Evolution (LTE)/LTE-A base station and a second node of the plurality of nodes comprises a Wi-Fi access point.

20. The method of claim 17, wherein the first node comprises a first Long Term Evolution (LTE)/LTE-A base station, a second node of the plurality of nodes comprises a second LTE/LTE-A base station, and the first LTE/LTE-A base station and the second LTE/LTE-A base station operate asynchronously.

21. The method of claim 1, further comprising:
determining whether a second triggering event has occurred; and
implementing, at the first node, the first access protocol to contend for access to the wireless communication medium based at least in part on a determination that the second triggering event has occurred.

22. The method of claim 21, wherein the second triggering event comprises an absence of the first triggering event over a predetermined time.

23. An apparatus for wireless communication, comprising:
means for implementing, at a first node, a first access protocol to contend for access to a wireless communication medium shared by a plurality of nodes, wherein the first access protocol comprises a frame-based Listen Before Talk (LBT) access protocol;
means for determining whether a first triggering event has occurred;
means for implementing, at the first node, a second access protocol to contend for access to the wireless communication medium based at least in part on a determination that the first triggering event has occurred, wherein the second access protocol comprises an LBT access protocol; and
means for transmitting a signal over the wireless communication medium without contending for access to the wireless communication medium in combination with implementing the second access protocol.

24. The apparatus of claim 23, wherein the first triggering event comprises at least one of a use of the wireless communication medium satisfying a threshold, or a use ratio of the wireless communication medium satisfying a threshold, or a combination thereof.

25. The apparatus of claim 24, wherein the use ratio of the wireless communication medium is based at least in part on a use of the wireless communication medium by the first node and a use of the wireless communication medium by at least a second node of the plurality of nodes.

26. An apparatus for wireless communication, comprising:
a processor;
memory in electronic communication with the processor; and
instructions stored in the memory, the instructions being executable by the processor to:
implement, at a first node, a first access protocol to contend for access to a wireless communication medium shared by a plurality of nodes, wherein the first access protocol comprises a frame-based Listen Before Talk (LBT) access protocol;
determine whether a first triggering event has occurred; and
implement, at the first node, a second access protocol to contend for access to the wireless communication medium based at least in part on a determination that the first triggering event has occurred, wherein the second access protocol comprises an LBT access protocol; and
transmitting, from the first node, a signal over the wireless communication medium without contending for access to the wireless communication medium in combination with implementing the second access protocol.

27. A non-transitory computer-readable medium storing computer-executable code for wireless communications, the code executable by a processor to:
- implement a first access protocol to contend for access to a wireless communication medium shared by a plurality of nodes, wherein the first access protocol comprises a frame-based Listen Before Talk (LBT) access protocol;
- determine whether a first triggering event has occurred; and
- implement a second access protocol to contend for access to the wireless communication medium based at least in part on a determination that the first triggering event has occurred, wherein the second access protocol comprises an LBT access protocol; and
- transmitting, from the first node, a signal over the wireless communication medium without contending for access to the wireless communication medium in combination with implementing the second access protocol.

* * * * *